(12) United States Patent
Hirahara et al.

(10) Patent No.: US 7,959,300 B2
(45) Date of Patent: Jun. 14, 2011

(54) PROJECTED IMAGE DISPLAY UNIT

(75) Inventors: Keiichiroh Hirahara, Tokyo (JP); Akira Sakurai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 611 days.

(21) Appl. No.: 11/994,214

(22) PCT Filed: Jun. 29, 2006

(86) PCT No.: PCT/JP2006/312970
§ 371 (c)(1),
(2), (4) Date: Mar. 27, 2008

(87) PCT Pub. No.: WO2007/004502
PCT Pub. Date: Jan. 11, 2007

(65) Prior Publication Data
US 2009/0207383 A1 Aug. 20, 2009

(30) Foreign Application Priority Data

Jun. 30, 2005 (JP) ................................. 2005-192511

(51) Int. Cl.
*G03B 21/14* (2006.01)
(52) U.S. Cl. ................ 353/69; 353/31; 353/32; 353/33; 353/34; 353/70; 353/78; 353/119; 353/122; 345/156; 345/157; 345/163; 345/8; 345/9; 345/158; 345/180; 345/182; 345/183; 348/745; 348/746; 348/747; 348/807; 348/806; 348/191; 348/189; 348/658; 349/5; 349/6; 349/7; 349/58
(58) Field of Classification Search .................... 353/69, 353/70, 119, 122, 31, 32, 33, 34, 78; 348/745, 348/746, 747, 807, 806, 190, 191, 189, 658; 345/156, 157, 163, 700, 9, 8, 158, 180, 182, 183; 349/5, 6, 7, 58
See application file for complete search history.

(56) References Cited

U.S. PATENT DOCUMENTS

| | | | | |
|---|---|---|---|---|
| 5,200,815 | A * | 4/1993 | Tsujihara et al. | 348/181 |
| 5,532,764 | A * | 7/1996 | Itaki | 348/745 |
| 6,219,011 | B1 * | 4/2001 | Aloni et al. | 345/1.3 |
| 6,361,171 | B1 * | 3/2002 | Ejiri et al. | 353/69 |
| 6,456,339 | B1 * | 9/2002 | Surati et al. | 348/745 |
| 6,783,247 | B2 * | 8/2004 | White | 353/79 |
| 7,182,466 | B2 * | 2/2007 | Sunaga | 353/70 |
| 2003/0068094 | A1 * | 4/2003 | Kimura et al. | 382/274 |
| 2004/0061838 | A1 * | 4/2004 | Mochizuki et al. | 353/69 |

(Continued)

FOREIGN PATENT DOCUMENTS
JP 6 269002 9/1994
(Continued)

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

A projection image display device including a display plane for displaying an image, a projection mechanism projecting an image on the display plane, and an imaging mechanism arranged on the same side of the display plane as the projection mechanism for imaging the display plane. The imaging mechanism is arranged at a position where a position symmetric with respect to the display plane of the projection mechanism is out of the range of the field angle of the imaging mechanism. By arranging the imaging mechanism at a position where no direct reflecting light of the light source of the projection mechanism comes, it is possible to prevent generation of a hot spot.

26 Claims, 30 Drawing Sheets

U.S. PATENT DOCUMENTS

| | | | |
|---|---|---|---|
| 2005/0018144 A1* | 1/2005 | Wada et al. | 353/69 |
| 2005/0062939 A1* | 3/2005 | Tamura | 353/69 |
| 2005/0168705 A1* | 8/2005 | Li et al. | 353/69 |
| 2006/0146015 A1* | 7/2006 | Buchmann | 345/156 |

FOREIGN PATENT DOCUMENTS

| | | |
|---|---|---|
| JP | 9 326981 | 12/1997 |
| JP | 2940716 | 6/1999 |
| JP | 2000 101981 | 4/2000 |
| JP | 3171955 | 3/2001 |
| JP | 2003 94886 | 4/2003 |
| JP | 2003 143348 | 5/2003 |
| JP | 2003 153136 | 5/2003 |
| JP | 2004 32665 | 1/2004 |
| JP | 2004 109402 | 4/2004 |
| JP | 2004 233584 | 8/2004 |
| JP | 2005 354171 | 12/2005 |
| WO | 00 57245 | 9/2000 |

* cited by examiner

FIG.33
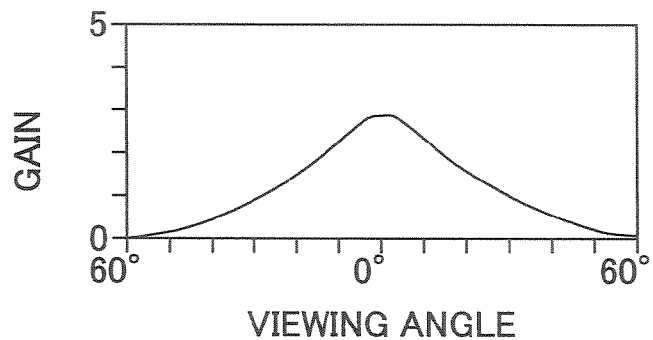
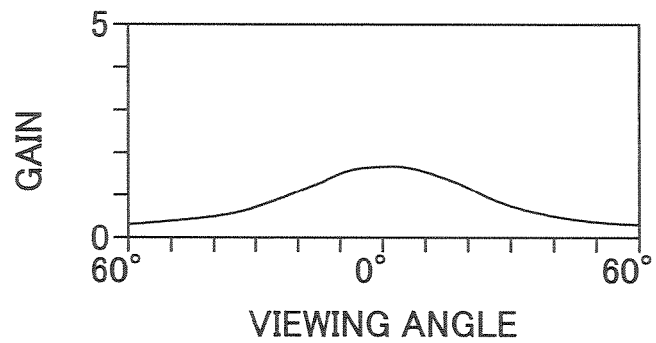
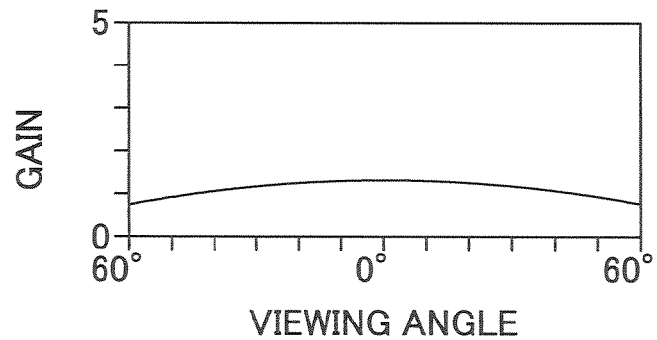

PROJECTED IMAGE DISPLAY UNIT

TECHNICAL FIELD

The present invention relates to projected image display units. In particular, the present invention relates to a drawn image data retention method, a drawn image data retention apparatus, and a projected image display unit that superpose drawn image data, obtained by capturing the image of an object such as written information on the front surface of a screen, on the image data of an image projected onto the screen, and project them from the rear side of the screen; and bind the drawn image data to the image data and store them.

BACKGROUND ART

Conventionally, there have been used projected image display units of a rear projection type, which project an image onto a transmission screen with a projector from the backside (rear side) of the screen opposite to the surface viewed by a viewer (front surface).

FIG. 1 is a diagram showing examples of the projected image display unit. FIG. 1 shows two projected image display units 1 and 2. The projected image display unit 1 is a vertical type, and the projected image display unit 2 is a table type.

Some of such projected image display units are capable of capturing the image of an object on the front surface of a screen 3 with a camera from the rear side of the screen 3.

The image capturing is affected by the contrast ratio of a projector. The contrast ratio of the projector is expressed by the ratio of the brightness of an all white projection to the brightness of an all black projection. When the brightness of a lamp is constant, low contrast means high brightness of black projection, and the transmittance of the lamp at the time of black projection is also high.

Many recent DLP projectors enjoy high contrast, in which the effect of a lamp center light is relatively small. However, the effect of the lamp cannot be ignored even in black projection in conventional projectors with approximate contrast of 50:1 to 1000:1. (See Patent Documents 1 through 6.)

Further, in recent years, this rear-projection-type display has been used in demonstrations in events, conferences, etc., and there is strong demand for the function of displaying a drawn image written onto the front surface side of a screen on the screen in combination with an image projected onto the screen and the function of manipulating an image projected onto the screen by directly touching the front surface of the screen with a hand.

One method that satisfies this demand is to capture the image of an object on the front surface of a screen from its rear surface side with a camera using a CCD solid-state image sensing device and extract necessary information from the captured image.

In general, screens conventionally used for rear-projection-type displays, which give importance to visibility at the time of viewing from the front side, are provided with a Fresnel lens for making uniform the amount of light at the time of viewing the projected light of a projector from the front side and a lenticular lens for improving visibility. However, capturing an image on the screen using them from its rear side results in a distorted image. Further, there is a problem in that while it is necessary for external light from the front side of the screen to be sufficiently transmitted to its rear surface side in order to have good image quality, an increase in the scattering performance of light projected from the rear side decreases the transmission performance.

Therefore, for example, a mask is provided between a projector and a screen, and the mask is caused to be in a transmission state during a projection display period and in a light interruption state or a light scattering state during an image capturing period. (See Patent Document 7.)

Further, a screen is formed by sandwiching liquid crystal between a lenticular lens and a Fresnel lens, and an electric field is applied to the liquid crystal so that the liquid crystal matches the lenticular lens in refractive index so as to cause the screen to be in the light transmission state at the time of image capturing and the liquid crystal does not match the lenticular lens in refractive index so as to cause the screen to be in the light scattering state at the time of displaying. (See Patent Document 8).

However, these techniques make it expensive to manufacture screens, and make it necessary to control screen conditions, a camera, and projection with high accuracy at high speed in order to prevent a user viewing the surface of projection from the front side from feeling oddness, thus complicating system configuration and control.

On the other hand, a region that diffuses light and a region that transmits light from the front surface are provided like a lattice, thereby improving the visibility of a projected image and the quality of an image captured by a camera on the rear side. (See Patent Document 9.)

This technique has the advantage that external light is taken in with efficiency, the visibility of a projected image is prevented from being degraded, and there is no need to switch states during use of the apparatus. However, there are the problems of high technical difficulty and high cost because the diffusion region and the transmission region of the screen should be placed with high accuracy considering displaying a projected image with good quality to a viewer on the front side of the screen and the quality of the image captured from the rear side.

Further, image information and conference image information can be stored or transmitted to a remote place by using a screen selectively set to a scattering state or a transmission state electrically, and projecting an image from the rear side of the screen and capturing the image of original material and participants disposed on the front side of the screen from the rear side of the screen. (Patent Document 10.)

[Patent Document 1] Japanese Laid-Open Patent Application No. 2004-109402
[Patent Document 2] Japanese Laid-Open Patent Application No. 2003-094886
[Patent Document 3] Japanese Laid-Open Patent Application No. 2004-032665
[Patent Document 4] Japanese Laid-Open Patent Application No. 2003-153136
[Patent Document 5] Japanese Laid-Open Patent Application No. 09-326981
[Patent Document 6] Japanese Patent No. 3171955
[Patent Document 7] Japanese Laid-Open Patent Application No. 06-269002
[Patent Document 8] Japanese Patent No. 2940716
[Patent Document 9] Japanese Laid-Open Patent Application No. 2000-101981
[Patent Document 10] Japanese Laid-Open Patent Application No. 2003-94886

DISCLOSURE OF THE INVENTION

Problems to be Solved by the Invention

When black display is performed at the time of capturing an image, the entire screen can be viewed as black from a viewer. However, a hot spot 5 of a projector enters the image captured by a camera as shown in FIG. 2. The hot spot 5 is a phenomenon where the lamp of a projector appears like a spot. The hot spot 5 refers to a phenomenon where only one point lightens brightly when viewed from an angle at which the light of the projector is directly reflected. This entrance of the hot spot 5 is referred to as "generation of the hot spot 5." This generation of the hot spot 5 is caused because the screen 3 also serves as a mirror surface at the same time as displaying projected light.

Further, since image capturing is performed using external light, it is difficult to capture the image of information on the screen surface in an environment with little illumination. In this case, the color of the projected light of the projector is changed so as to serve as the stroboscope of a camera. For example, in the case of capturing an image with all white display, the degradation of image quality due to the hot spot 5 is conspicuous as shown in FIG. 3.

Further, according to each of the techniques disclosed in the cited documents 7 through 10, an image based on image data is projected onto a screen, and, for example, information handwritten on the screen at the scene of a conference cannot be stored together with the data of a projected image or the stored information cannot be edited.

In view of these problems, the present invention has an object of providing a projected image display unit that avoids generation of a hot spot.

Means for Solving the Problems

In order to solve the above-described problems, the present invention is characterized by a display surface configured to display an image; projection means for projecting the image onto the display surface; and image capturing means for performing image capturing on the display surface, the image capturing means being placed on the same side of the display surface as the projection means, wherein the image capturing means is placed at a position so that the symmetrical position of the projection means with respect to the display surface is out of the range of an angle of view of the image capturing means.

In order to solve the above-described problems, the present invention is characterized by a display surface configured to display an image; projection means for projecting the image onto the display surface; and image capturing means for performing image capturing on the display surface, the image capturing means being placed on the same side of the display surface as the projection means, wherein the projection means is placed at a position so that the symmetrical position of the image capturing means with respect to the display surface is out of the range of the angle of view of the projection means.

The above-described projected image display units may also be further characterized by means for changing the optical path of the projection means and the optical path of the image capturing means.

They may also be characterized in that the changing means changes the optical path of the projection means and the optical path of the image capturing means with a reflection plane reflecting light.

They may also be characterized in that the changing means changes the optical path of the projection means and the optical path of the image capturing means so that the optical paths pass through the display surface.

They may also be characterized in that the image capturing means is placed so that the optical path of the projection means and the optical path of the image capturing means are prevented from overlapping each other on the reflection plane of the changing means.

They may also be characterized in that the projection means is placed so that the optical path of the projection means and the optical path of the image capturing means are prevented from overlapping each other on the reflection plane of the reflection means.

They may also be characterized by changing means for projection for changing the optical path of the projection means so that the optical path of the projection means passes through the display surface; and changing means for image capturing for changing the optical path of the image capturing means so that the optical path of the image capturing means passes through the display surface.

They may also be characterized in that the projection means displays an image captured by the image capturing means in which a distortion is corrected.

They may also be characterized in that the image capturing means is capable of shifting or tilting the lens of the image capturing means.

They may also be characterized in that the projection means is capable of shifting or tilting the lens of the projection means.

They may also be characterized in that the image capturing means captures the image of a writing formed on the display surface or an image in contact with the display surface.

They may also be characterized in that the projection area of the projection means on the display surface is substantially equal to the image capturing area of the image capturing means.

Effects Of The Present Invention

According to the present invention, it is possible to provide a projected image display unit that avoids generation of a hot spot.

BRIEF DESCRIPTION OF THE DRAWINGS

FIG. 33 is a diagram showing light transmission characteristics in the case of providing antireflection films in order to prevent external light from entering the screen.

DESCRIPTION OF THE REFERENCE NUMERALS

Figure 1:
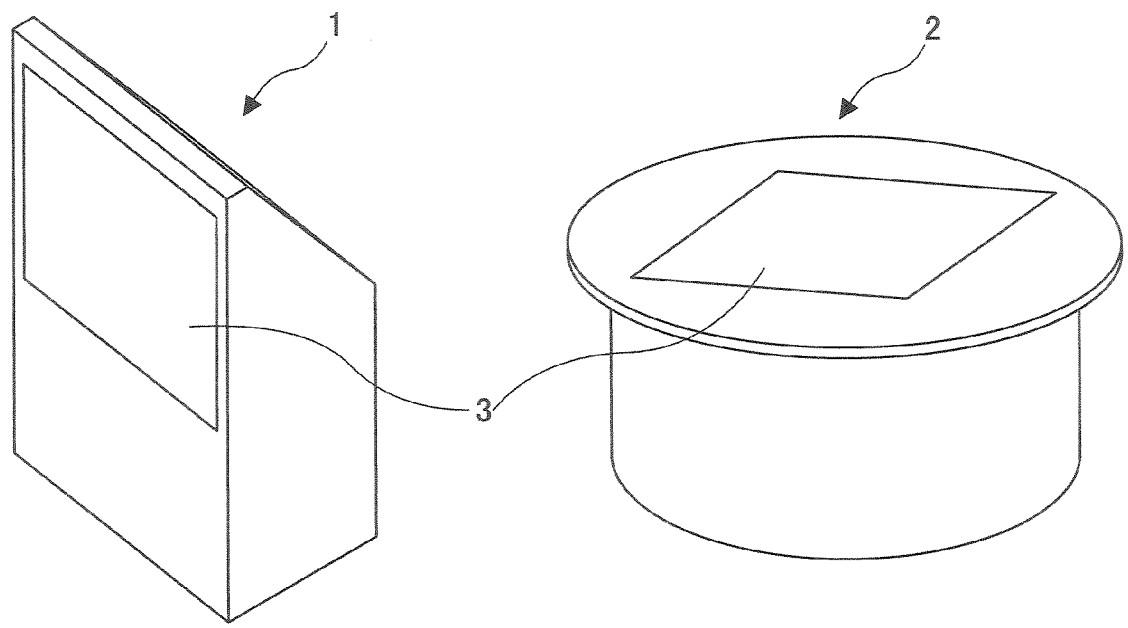
FIG. 1 is a diagram showing a projected image display unit.
Figure 2:
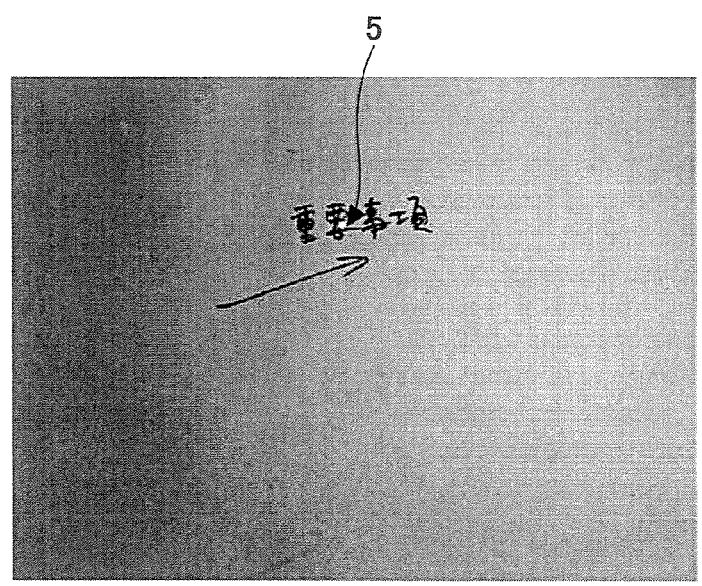
FIG. 2 is a diagram showing a hot spot.
Figure 3:
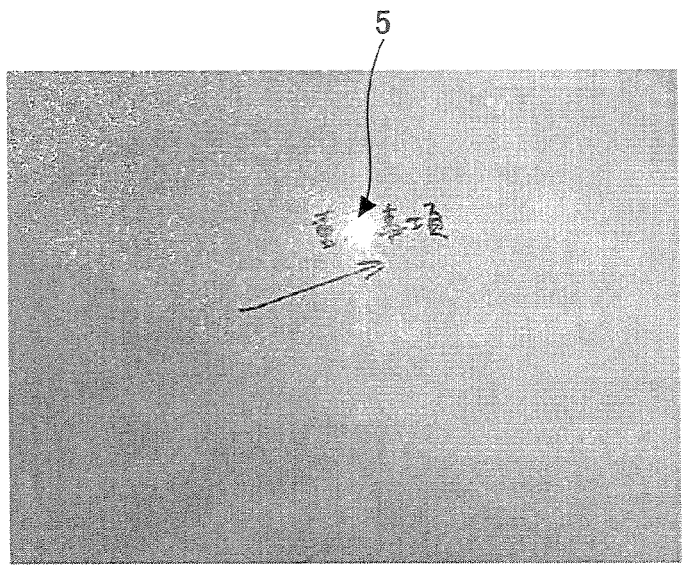
FIG. 3 is a diagram showing another hot spot.

| | |
|---|---|
| 1, 2 | Projected image display unit |
| 3, 10 | Screen |
| 5 | Hot spot |
| 11, 11a, 11b | Camera |
| 12, 12a, 12b | Projector |
| 13 | PC |
| 14 | Switch |
| 15 | Viewer |
| 20 | Lens |
| 21 | Imaging plane |
| 22 | Focal plane |
| 23, 23a, 23b | Mirror |
| 31 | Area |
| 101 | Screen |
| 101a | Display surface side |
| 101b | Rear surface side |
| 102 | Projector |
| 102a, 103a | Lens surface |
| 103 | Digital Camera |
| 104 | Enclosure |
| 104b | Bottom surface |

-continued

| | |
|---|---|
| 105 | Mirror |
| 110 | Rear projection display unit |
| 130 | Image display means |
| 131 | Image extraction part |
| 132 | Image obtaining part |
| 133 | Data addition part |
| 134 | Switch means |
| 135 | Projection file |
| 140 | Virtual printer driver |
| 150 | Glass |
| 151 | Diffusion sheet |
| 152 | Fresnel lens |
| 153 | Light source |
| 155 | Parallel optical path |
| 201 | Diffusion particle layer |
| 202 | Acryl layer |
| 203, 207 | Transparent thin film |
| 204 | Transparent member |
| 205 | Flat plate member |
| 206 | Adhesive agent |
| 208 | Air layer |
| 210 | Drawn image |
| 220 | Document image |
| 230 | Image file |

Best Mode for Carrying Out the Invention

A description is given below, with reference to the drawings, of embodiments of the present invention. In this embodiment, a description of already described reference numerals may be omitted. Further, in this embodiment, it is assumed that an angle of view indicates a range within which an image can be captured with the lens of a camera or a range within which a projector can perform projection.

In general, the length and the width of the image capturing element of a camera are different. Accordingly, the angle of view of the camera includes a horizontal angle of view and a vertical angle of view. Likewise, the angle of view of a projector includes a horizontal angle of view and a vertical angle of view. In the description of this embodiment, an angle of view means a horizontal angle of view and a vertical angle of view.

Figure 4:
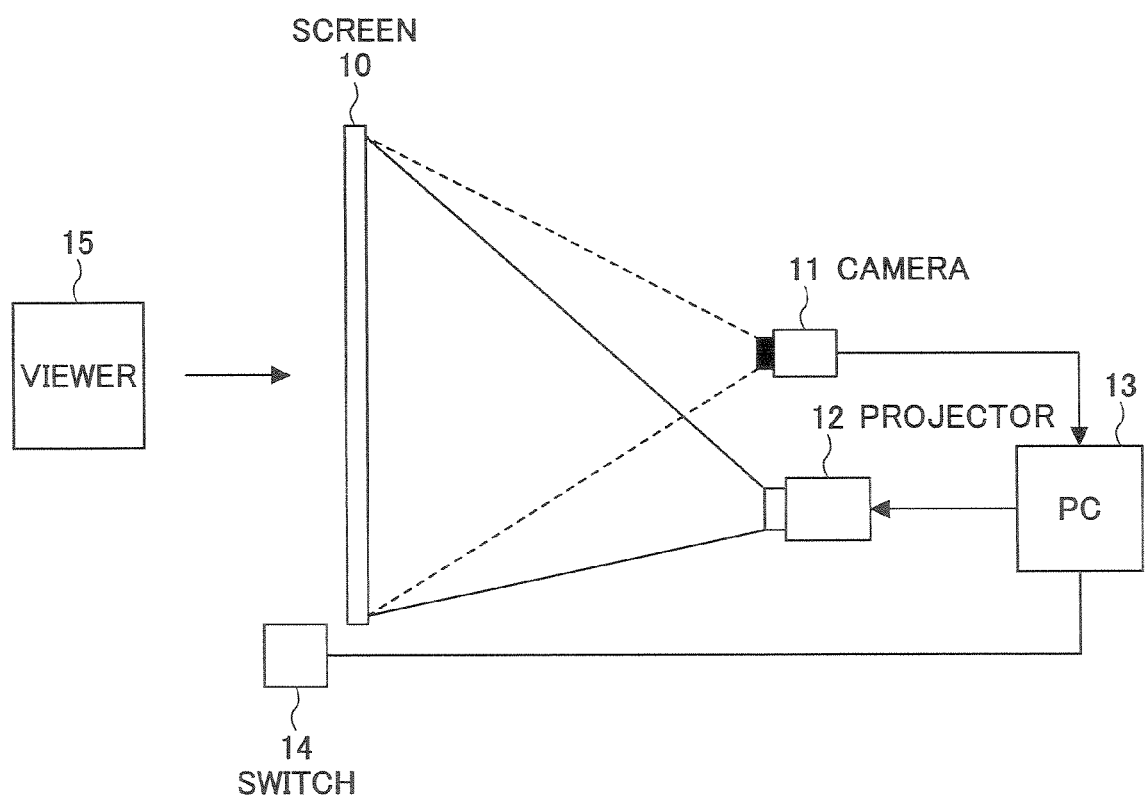
FIG. 4 is a diagram showing a basic configuration of a projected image display unit according to an embodiment.

FIG. 4 is a diagram showing a basic configuration of a projected image display unit according to this embodiment. FIG. 4 shows a screen 10, a camera 11, a projector 12, a PC (Personal Computer) 13, and a switch 14. Further, a viewer 15 is shown for describing a direction from which this projected image display unit is viewed.

Letting the side of the screen 10 viewed by the viewer 15 be the front surface (display surface), the projector 12 performs projection and the camera 11 captures an image from the rear side of the screen 10.

The projector 12 that is projection means is connected to the PC 13 and projects an image from the PC 13. The PC 13 may be contained in the unit or externally connected. The PC 13 may be any information processor capable of image processing, and is not limited to a PC.

The switch 14 for processing commands is provided on the viewer 15 side. This may be a mouse for operating the PC 13 or the switch 14 that generates a specific processing signal. In the case of the switch 14, it may be one configured to include multiple buttons generating respective signals for corresponding operations, such as numeric keys. Alternatively, multiple unit-specific buttons may be provided.

The screen 10, which is a display surface, is a rear-projection-type projector screen provided with a protection sheet or subjected to treatment so that writing can be performed thereon with a common whiteboard marker.

The camera 11 that is image capturing means is contained in the projected image display unit. This camera 11 is provided so that the angle of view of the camera matches an image projected onto the screen 10. The area of the display surface within which an image is captured by the camera 11 may not be entirely equal to the area of the display surface onto which projection is performed by the projector 12. For example, if a writing area may not be the entire display surface onto which projection is performed by the projector 12, the writing area may be the area of the display surface within which an image is captured by the camera 11.

In addition to an image projected onto the screen 10, the camera 11 captures the image of writing formed on the screen 10 by the viewer 15 and an image in contact with the display surface. Further, in this embodiment, the camera 11 is a CCD camera.

The above-described overall configuration of the projected image display unit only shows configuration, and the camera 11 and the projector 12 in this embodiment take various positions as described below.

The viewer writes additional matter onto this projected image display unit with a whiteboard marker while viewing a projected image on the screen 10. After the writing, the viewer commands processing with the switch 14, so that the camera 11 performs image capturing. The purpose of this image capturing is to capture the image of characters or drawings written onto the screen. Therefore, the projected light of the projector 12 is temporarily blocked at the time of capturing the image in order to prevent the projected image from being captured. This light blocking condition is achieved by making the projected image all black, for example, by making the PC 13 perform all black display.

Figure 5:
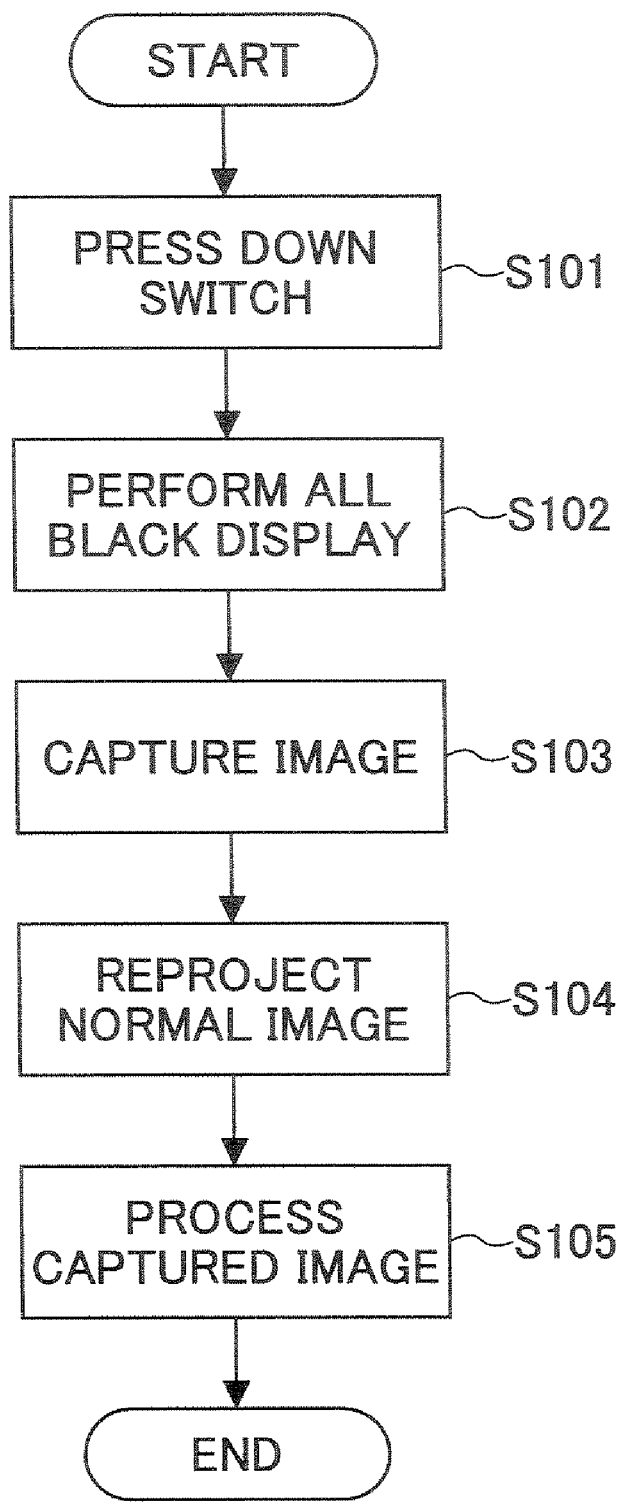
FIG. 5 is a flowchart showing the operation of capturing the image of a still image.

A specific description is given, using the flowchart of FIG. 5, of the operation of capturing a still image in this projected image display unit. In step S101, a user presses down the switch 14. In step S102, all black display is performed. Next, in step S103, the camera 11 captures an image. In step S104 after the image capturing, the projector 12 reprojects a normal image. Thereafter, in step S105, the image captured earlier is processed.

In this embodiment, a description is given based on the assumption that the camera captures an image in accordance with a user's operation. Alternatively, the camera 11 may capture an image every time a predetermined period of time passes.

A description is given below of a configuration that avoids generation of a hot spot. First, prior to this description, a description is given of the cause of generation of a hot spot.

Figure 6:
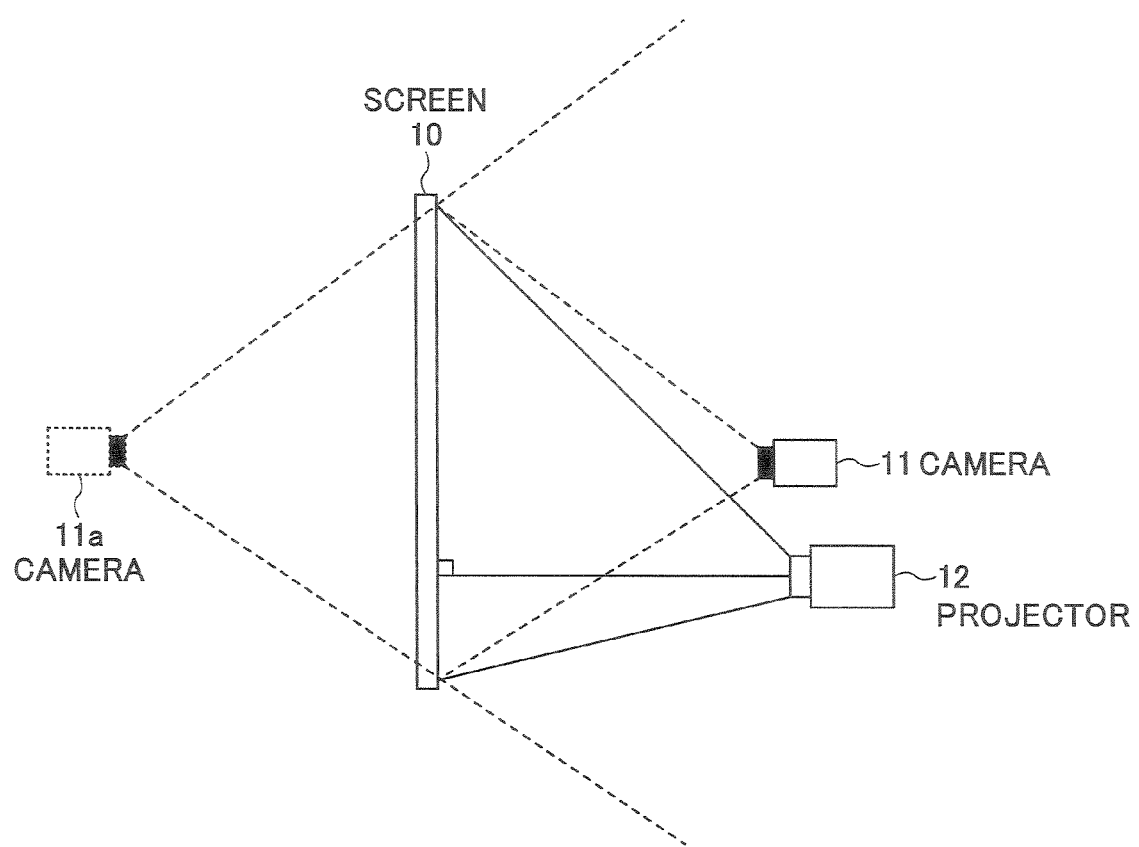
FIG. 6 is a diagram showing a configuration of the projected image display unit in the case where a hot spot is generated.

FIG. 6 shows a configuration of the projected image display unit in the case where a hot spot is generated. FIG. 6 shows the camera 11 and a camera 11a are in the positions plane-symmetric with respect to the screen 10 as an axis of symmetry. Hereinafter, the camera 11 or the projector 12 that is in the position plane-symmetric with respect to an axis of symmetry may be expressed as a symmetry camera or a symmetry projector. As shown in FIG. 6, the projector 12 is within the angle of view of the camera 11a. Further, the camera 11 is within the angle of view of a symmetry projector, which is not shown in the drawing.

If the projector 12 is thus within the angle of view of the symmetry camera 11a in the position plane-symmetric with respect to the screen 10 as an axis of symmetry, a hot spot is generated. Further, a hot spot is also generated if the camera 11 is within the angle of view of the symmetry projector not shown in the drawing, which is in the position plane-symmetric with respect to the screen 10 as an axis of symmetry.

In the case of a configuration that has the same angle of view on the screen as the projected image display unit, if one is not within the angle of view, the other is not within the angle of view, either. Accordingly, it is possible to avoid generation of a hot spot by causing the projector 12 not to be included in the range plane-symmetric to the angle of view of the camera 11a or causing the camera 11 not to be included in the range plane-symmetric to the angle of view of the symmetry projector.

Thus, in this embodiment, generation of a hot spot is avoided by placing the camera 11 in a position that the direct reflected light of the light source of the projector 12 does not enter. In this embodiment, the effect of a hot spot is eliminated by determining the positional relationship between the camera 11 and the projector 12 so that the light source of the projector 12 is not within the angle of view (the range of image capturing) of the camera 11 so as to prevent a generated hot spot from entering an image captured by the camera 11 in the case of taking the screen 10 as a mirror.

Figure 7:
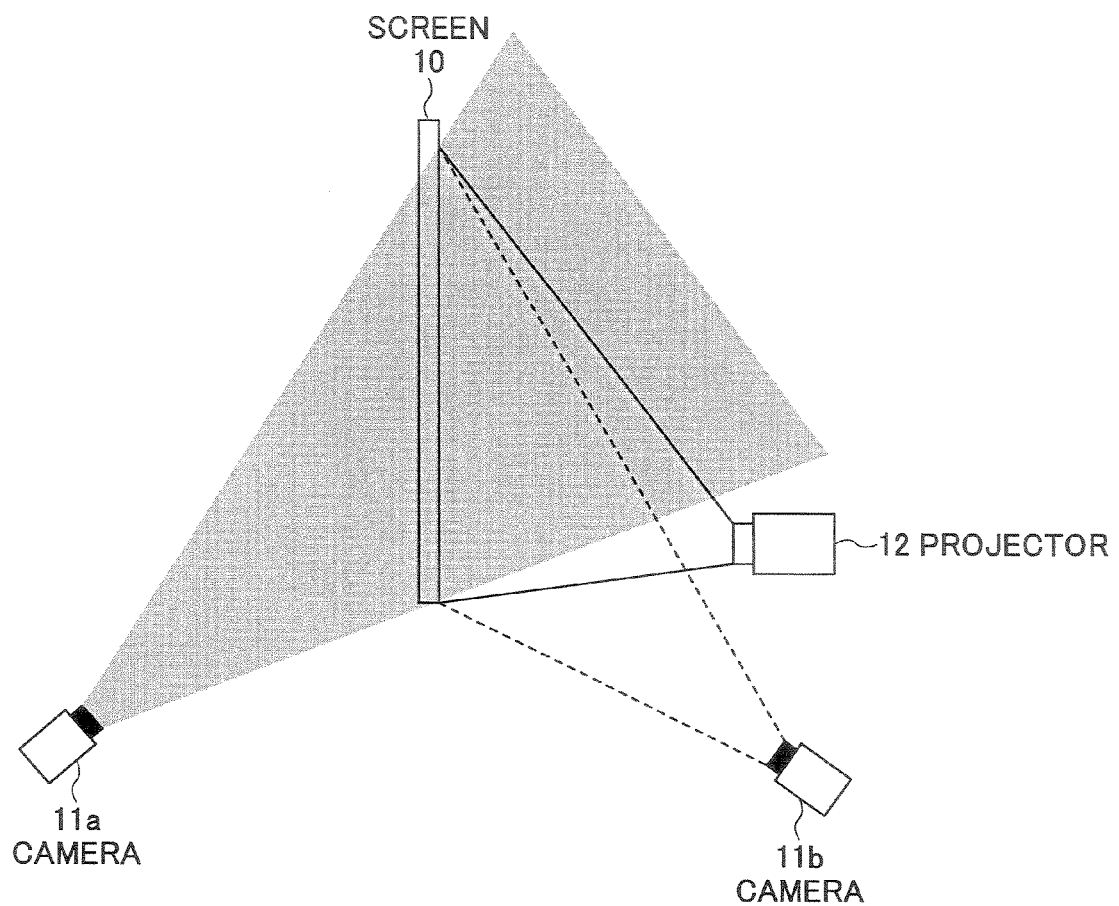
FIG. 7 is a diagram showing placement of a camera that does not include a projector in its angle of view.

FIG. 7 shows a projected image display unit configured to have the projector 12 out of the angle of view of the camera 11a. As shown in FIG. 7, the projector 12 is out of the angle of view of the camera 11a.

Figure 8:
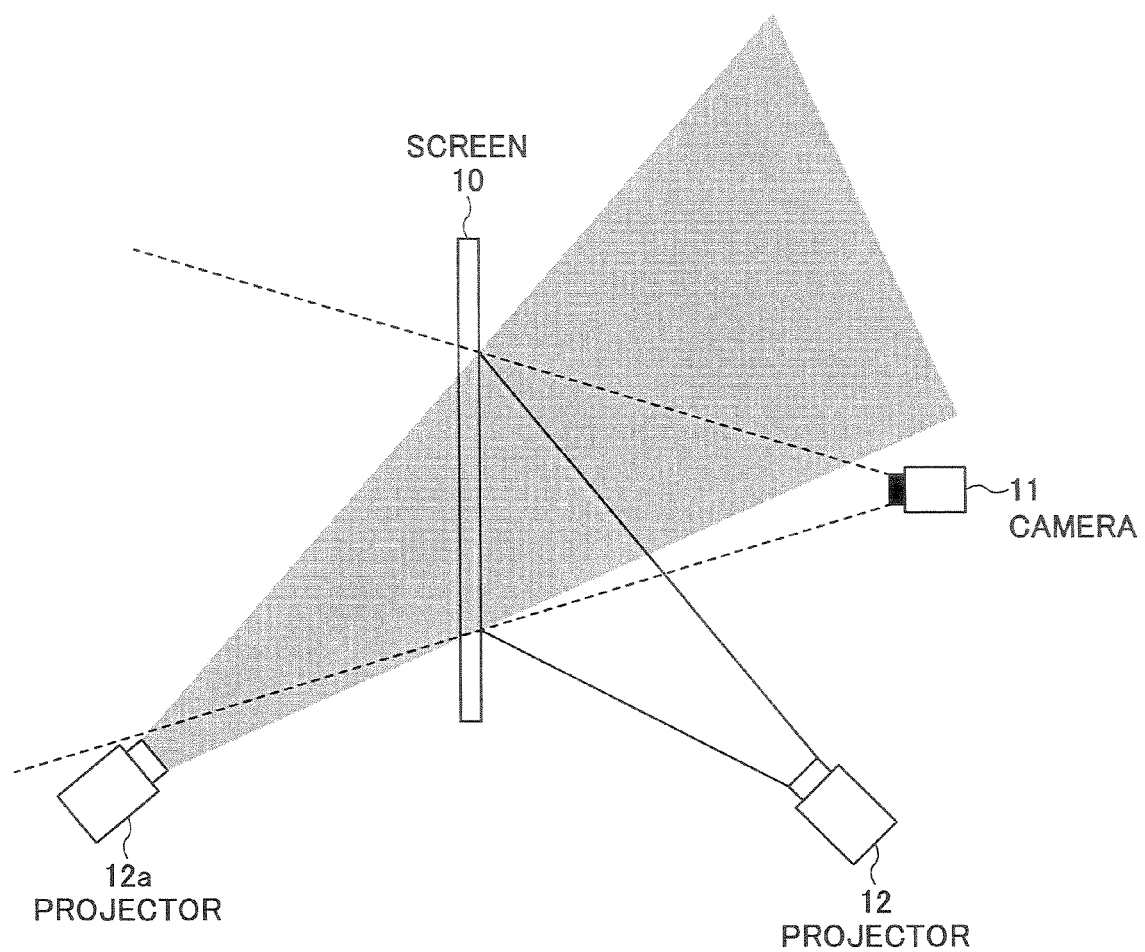
FIG. 8 is a diagram showing placement of the projector that does not include the camera in its angle of view.

FIG. 8 shows a projected image display unit configured to conversely have the camera 11 out of the angle of view of a projector 12a. As shown in FIG. 8, the camera 11 is out of the angle of view of the projector 12a.

Figure 9:
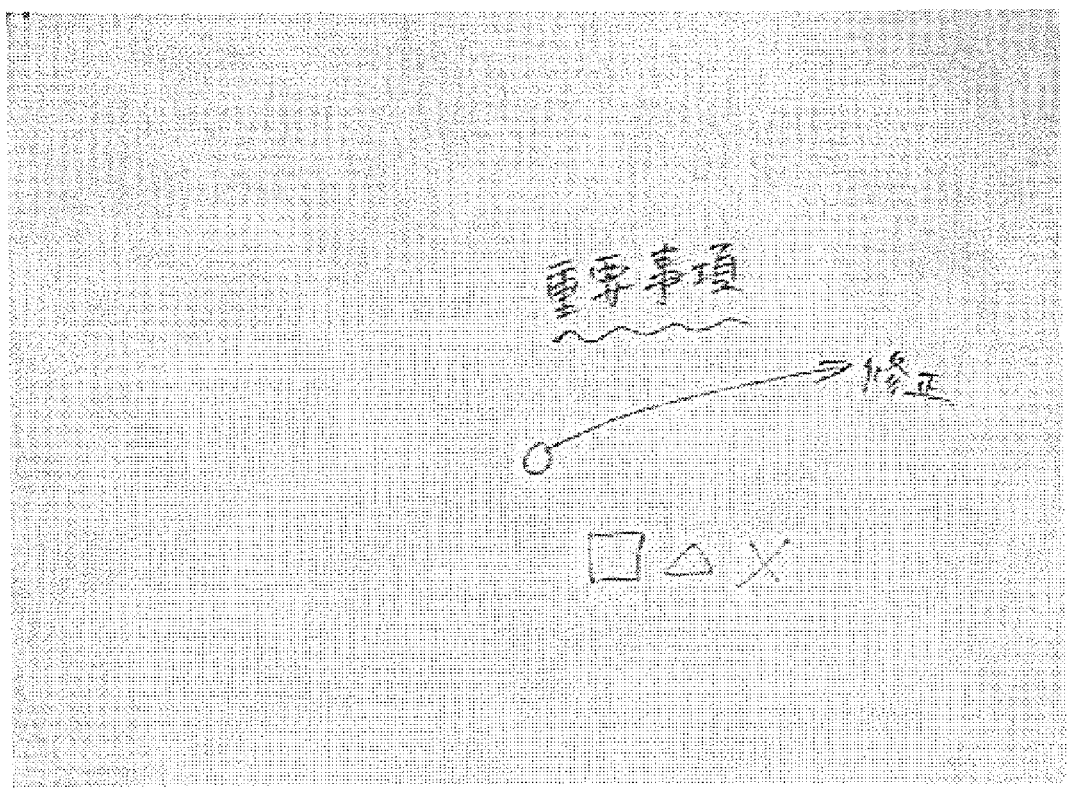
FIG. 9 is a diagram showing a screen that does not include a hot spot.

As shown in FIG. 9, generation of a hot spot is avoided in the image captured in this condition. However, the placement of the camera or projector shown in FIG. 7 or 8 causes distortion in the captured image because the optical axis is inclined with respect to the screen surface. Specifically, the rectangle of the screen surface is distorted into a trapezoid in the captured image. This trapezoidal distortion can be corrected using projective transformation.

Figure 10:
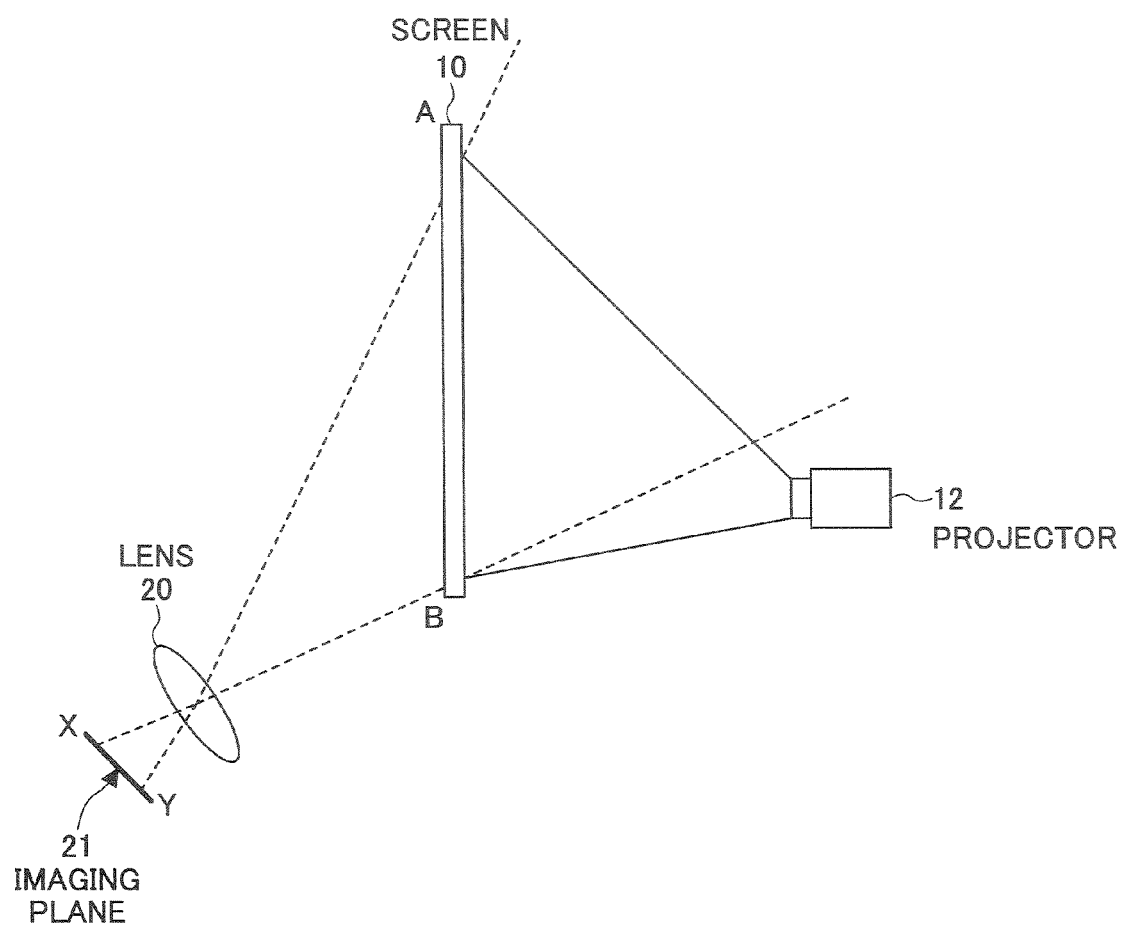
FIG. 10 is a diagram showing the inclination of an imaging plane with respect to the screen.
Figure 11:
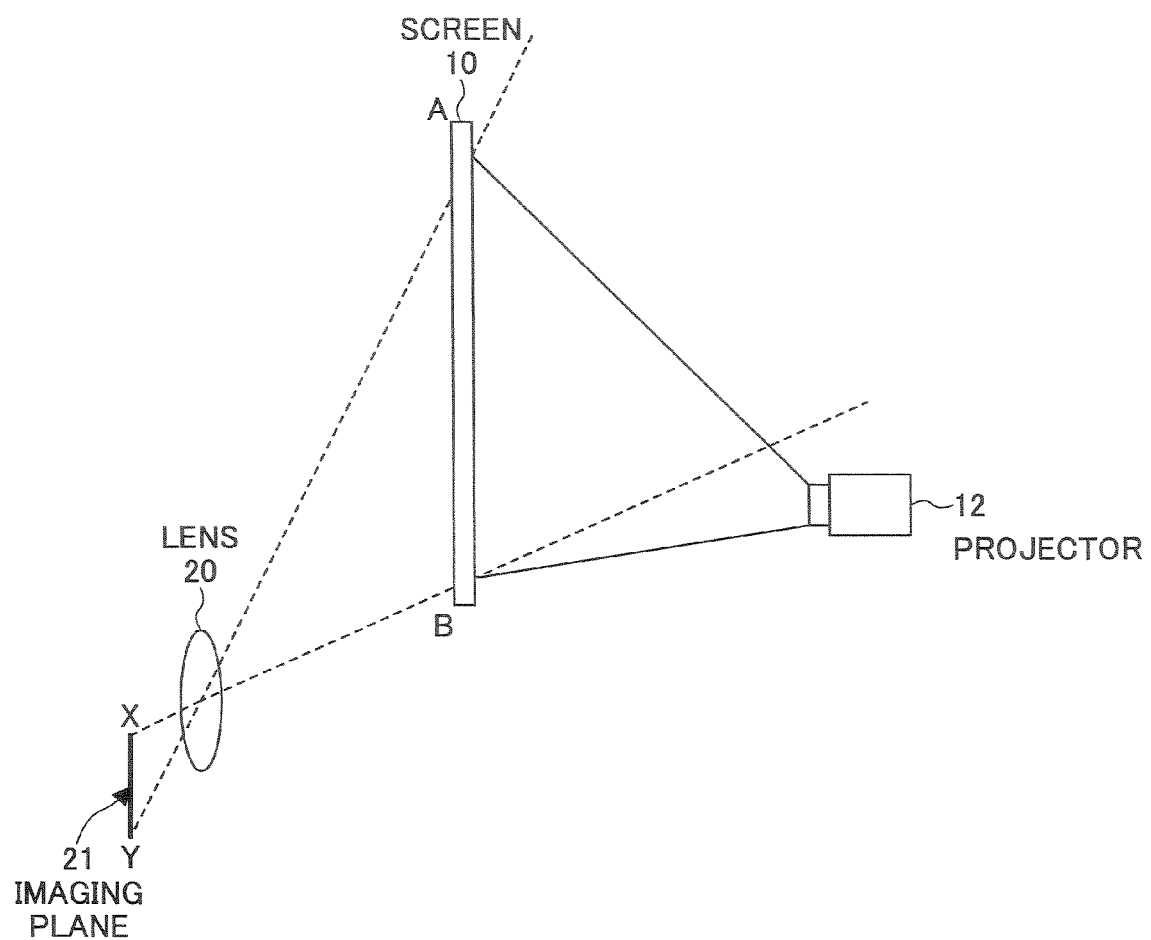
FIG. 11 is a diagram showing distortion correction by a lens shift.
Figure 12:
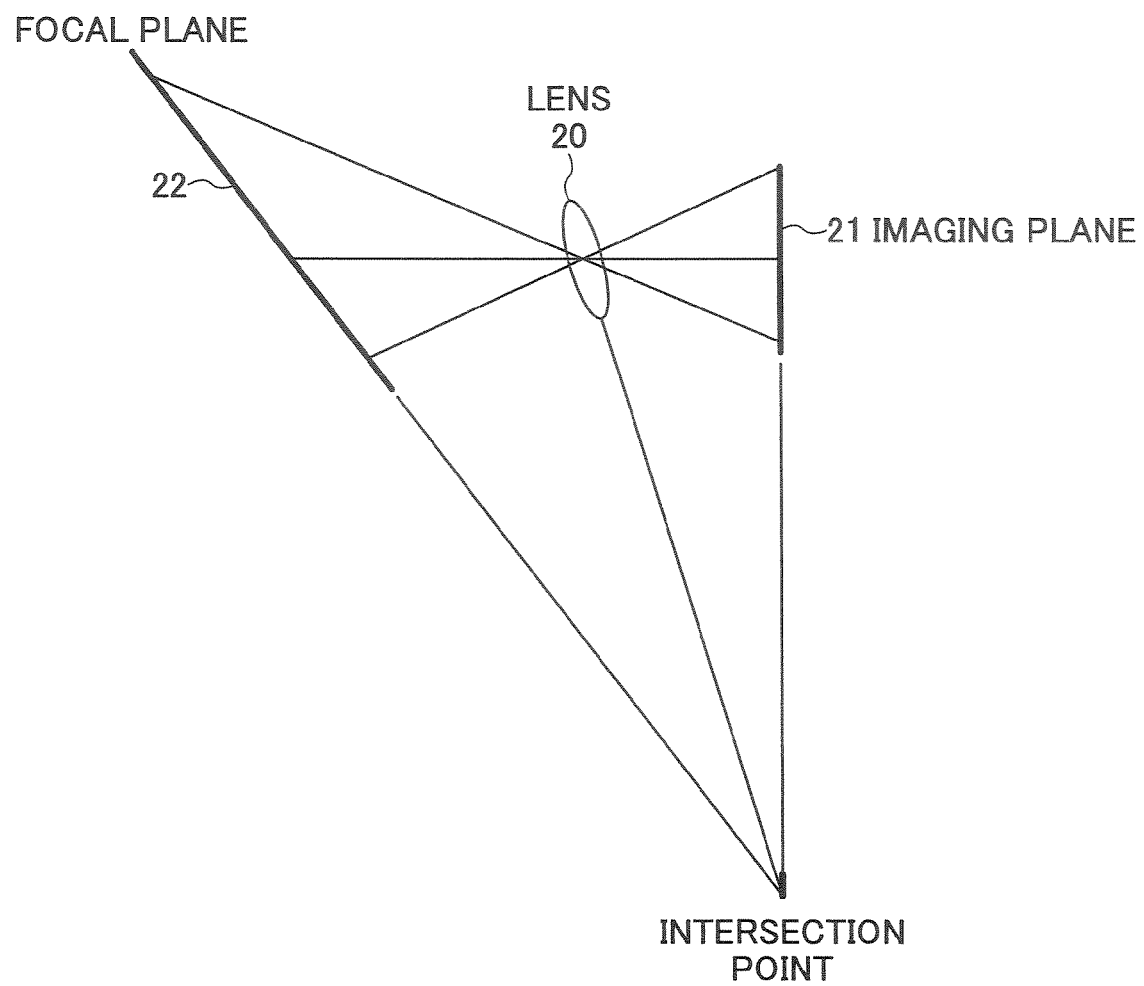
FIG. 12 is a diagram showing adjustment of a focal plane by a lens tile.

Further, this distortion is caused by an imaging plane 21 and the screen 10 subjected to image capturing through a lens 20 being not parallel as shown in FIG. 10. Accordingly, this trapezoidal distortion can be optically corrected by performing shift correction that offsets the optical axis of the lens 20 from the optical axis of the imaging plane 21 as shown in FIG. 11.

Further, since the screen is inclined with respect to the lens, the depth of field of the image capturing lens at each point on the screen surface may be less than a normal depth of field depending on the degree of inclination.

In this case, it is possible to focus on a focal plane 22 by inclining the lens 20, that is, tilting the lens 20, with respect to the imaging plane 21.

Thus, it is possible to optically correct image distortion caused in the case of determining placement of a camera so as to prevent a projector from being within the angle of view of the camera by combining the shift and tilt of the lens of the camera.

The tilt and shift of the lens are applicable not only to the camera but also to the projector. That is, it is possible to optically correct image distortion caused in the case of determining placement of the projector by combining the shift and tilt of the lens of the projector. Needless to say, in the case of the projector, the keystone correction of the projector may also be used.

Figure 13:
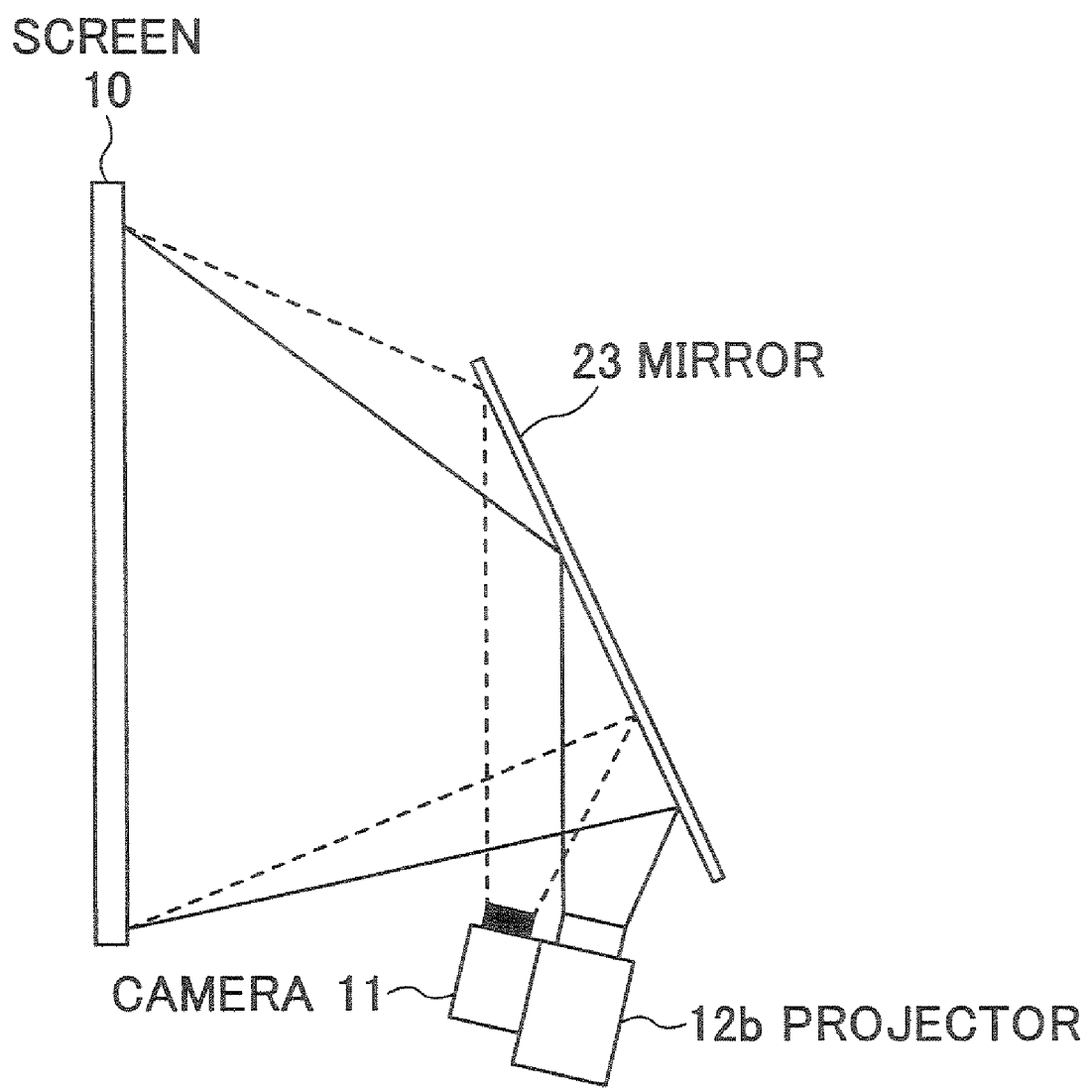
FIG. 13 is a diagram showing an optical path change by a mirror.

Next, a description is given of avoidance of generation of a hot spot in the case of the projectors 1 and 2 shown in FIG. 1. FIG. 13 is a configuration of the projector 1 or 2. The angle of view of each of the camera 11 and the projector 12 is adjusted to the screen 10 by way of a single mirror 23.

In the projectors 1 and 2, it is often difficult at the time of designing to ensure a sufficient optical path length for the projector or camera from a viewpoint of practical use such as the space saving characteristic of the unit. Therefore, in general, such a structure as to ensure optical path length through the mirror 23 is adopted.

Figure 14:
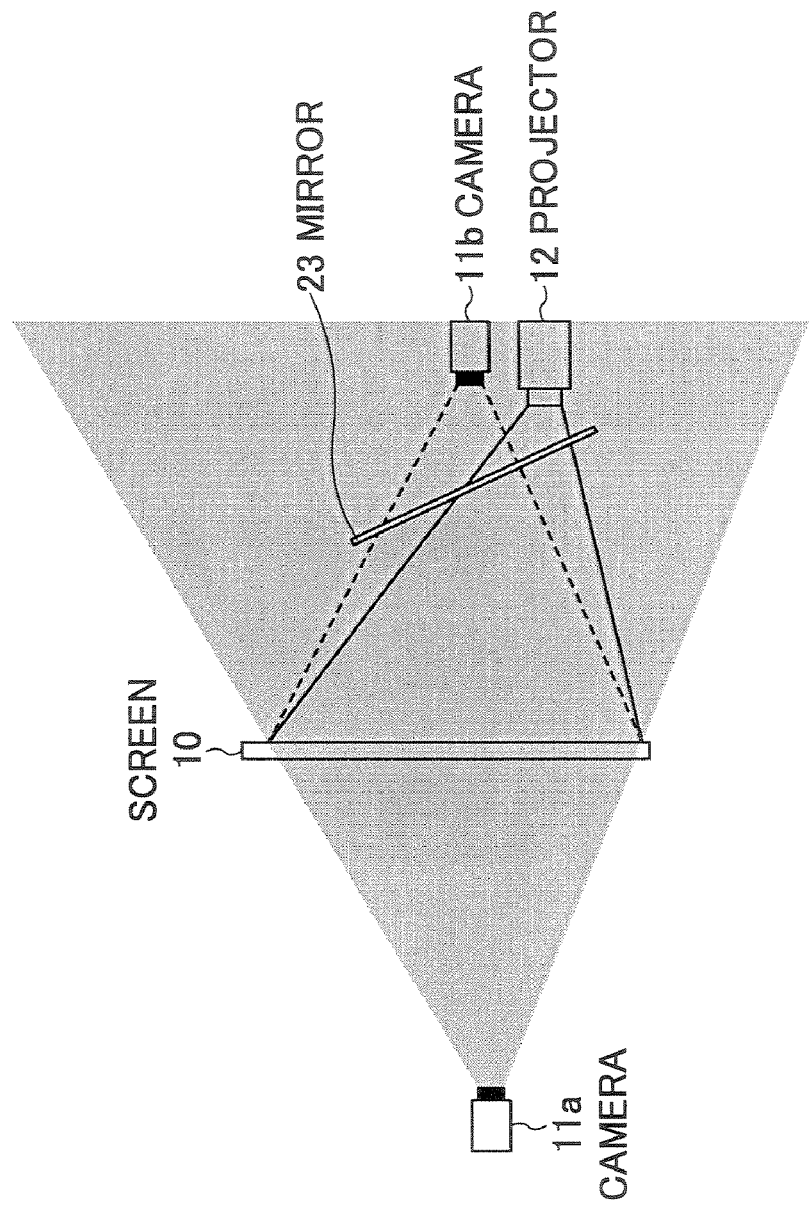
FIG. 14 is a developed view of a configuration of the projected image display unit using the mirror.

FIG. 14 shows a developed view of the arrangement of the camera and the projector of the projected image display unit shown in FIG. 13. In FIG. 14, a camera 11b and a projector 12b are shown in the positions plane-symmetric with respect to the mirror 23 as an axis of symmetry. Further, the camera 11a is shown in the position plane-symmetric to the camera 11b with respect to the screen 10 as an axis of symmetry.

As shown in FIG. 14, the projector 12 is included in the angle of view of the camera 11a. Accordingly, a hot spot is generated in the projected image display unit shown in FIG. 13.

Figure 15:
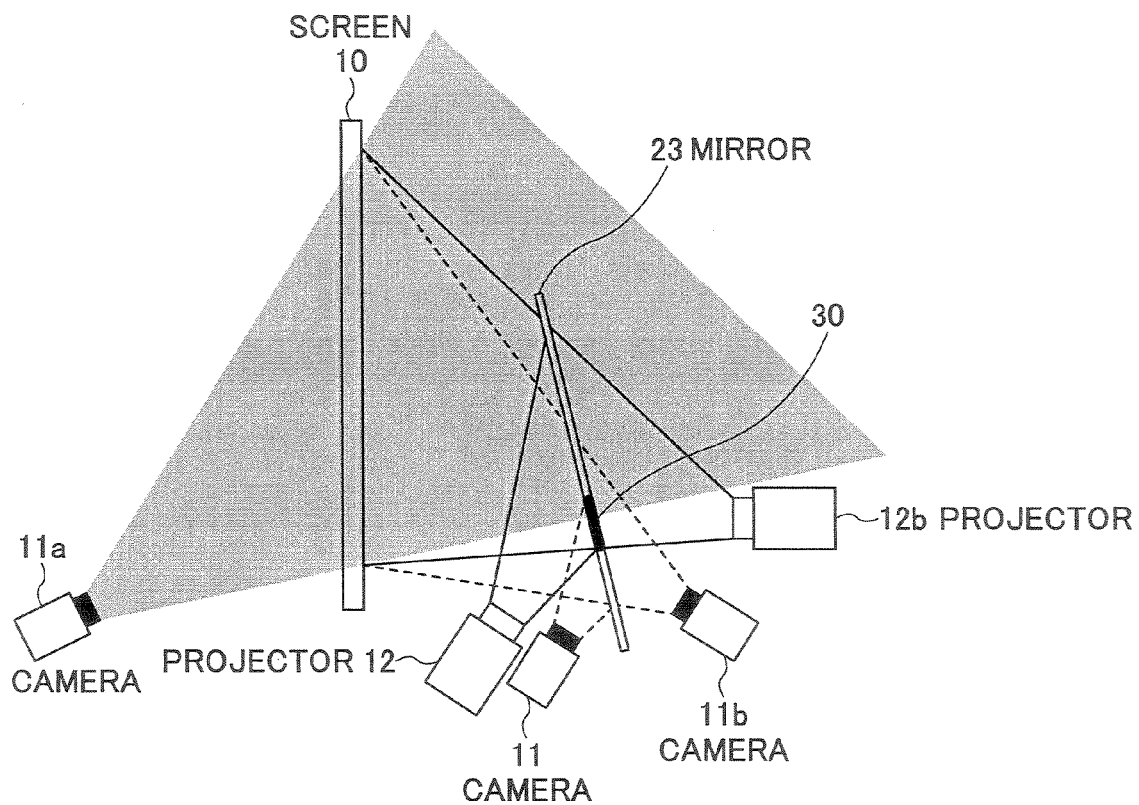
FIG. 15 is a diagram showing another placement of the camera that does not include the projector in its angle of view.

Therefore, it is possible to avoid generation of a hot spot by arranging the camera 11 and the projector 12 as shown in FIG. 15. FIG. 15 shows the camera 11b and the projector 12b in the positions plane-symmetric with respect to the mirror 23 as an axis of symmetry. Further, the camera 11a is shown in the position plane-symmetric to the camera 11b with respect to the screen 10 as an axis of symmetry. Further, there is a part 30 where the optical path of the camera 11 overlaps the optical path of the projector 12 in FIG. 15.

As shown in FIG. 15, the projector 12b is not included in the angle of view of the camera 11a. Accordingly, it is possible to avoid generation of a hot spot in the projected image display unit shown in FIG. 15.

Figure 16:
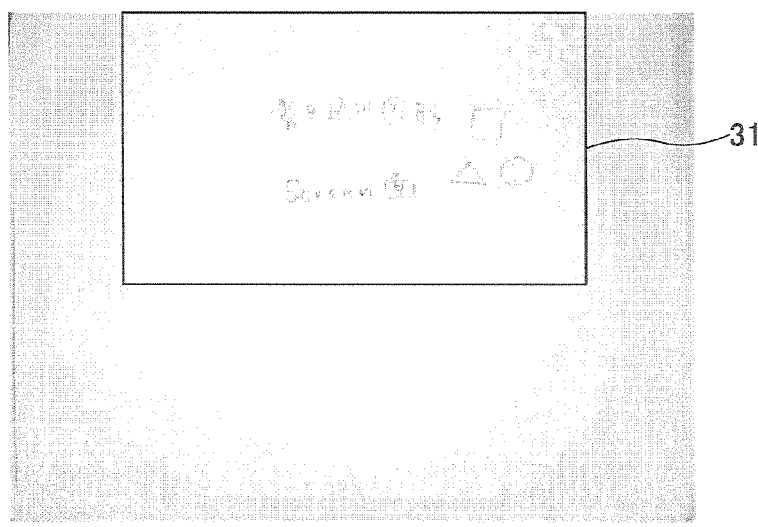
FIG. 16 is a diagram showing diffuse reflection.

However, because of the part 30, diffuse reflection of projector light is caused by dust adhering to the mirror 23, so that this reflected light enters a camera image. FIG. 16 is one at the time of projecting a white image from a projector as auxiliary light at the time of image capturing. An area 31 in the upper part of FIG. 16 shows that diffuse reflection of projector light has been caused by dust adhering to a mirror.

Figure 17:
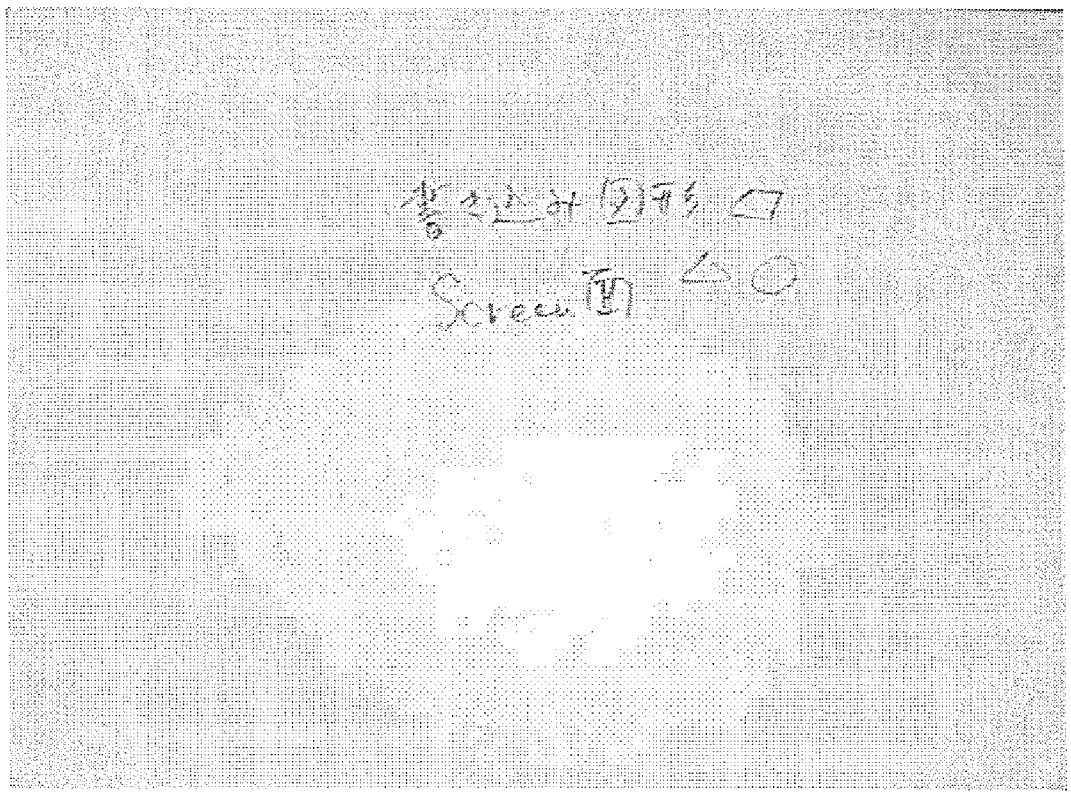
FIG. 17 is another diagram showing the screen that does not include a hot spot.

This diffuse reflection of light causes degradation of image quality. Therefore, in the case of forming a unit through a mirror, it is desirable that the optical path of the projector does not overlap the optical path of the camera on the mirror. Accordingly, it is possible to capture a high quality image as FIG. 17 by such an arrangement as to avoid generation of the hot spot of the projector and to prevent the optical paths of the projector and the camera from overlapping each other on the mirror surface (remove a highlight part due to diffuse reflection of light caused by foreign matter adhering to the mirror surface). Further, such a configuration as to prevent the optical paths of both from overlapping each other reduces the frequency of maintenance of the mirror, which is a merit in practical use.

Implementing a configuration where the projector is not within the angle of view of the camera and their optical paths do not overlap each other on the mirror surface with a single mirror in this manner increases the area of the mirror, and may not be desirable in view of a practical space saving design.

Further, the mirror itself may be distorted by its weight so as to cause distortion in a projected image. The distortion due to the distortion of the mirror surface cannot be corrected by the keystone correction of the projector or the like. Accordingly, it is preferable that the mirror area be as small as possible.

Figure 18:
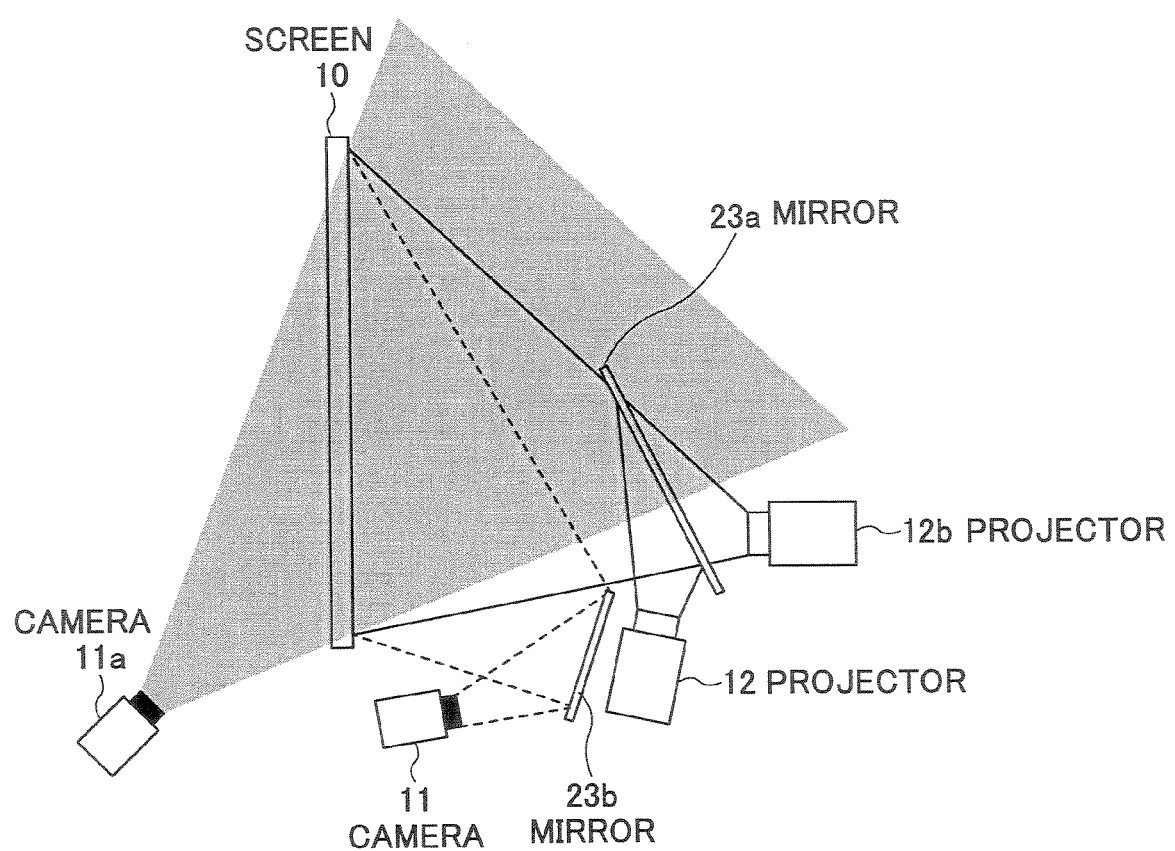
FIG. 18 is a diagram showing a configuration of the projected image display unit using two mirrors.

Therefore, it is desirable to use two mirrors as shown in FIG. 18. FIG. 18 shows a configuration where two mirrors 23a and 23b are used. That is, it is possible to eliminate the problem of highlight due to an optical system and the problem of highlight due to dust adhering to a mirror surface by the projector 12 and the camera 11 using the separate mirrors 23a and 23b that adjust their angles of view to the screen surface, respectively. Since the mirror area is also reduced, there is more latitude in designing such as practical space saving.

Figure 19:
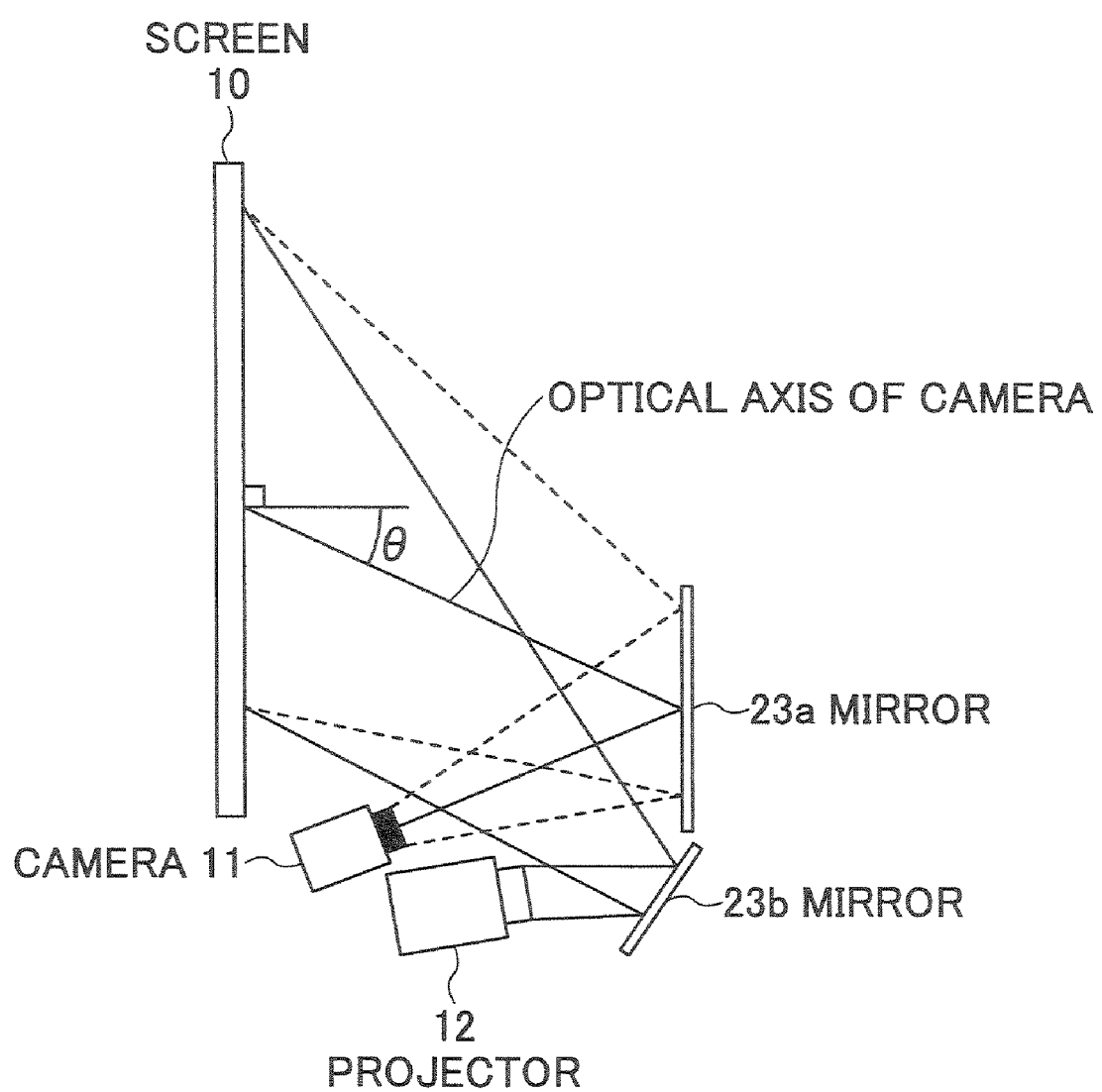
FIG. 19 is a diagram showing a tilt of the screen.

In the case of the table-type projected image display unit shown in FIG. 1, there is a limit to its height, and an increase in the dead space due to a large mirror or an arrangement for preventing degradation of image quality is not preferable. Therefore, using the two mirrors 23a and 23b as shown in FIG. 19 is extremely advantageous in terms of designing.

In the configuration of the table-type projected image display unit, the possibility is extremely high that the optical axis of the camera may not be perpendicular to and may be tilted with respect to the screen surface due to its space limitation, so that a trapezoidal distortion is caused in the configuration for preventing dust adhering to a mirror surface from degrading image quality.

As a measure against this, the above-described optical correction technique using the shift and tilt of a camera lens is effective. However, since a special lens is used in such a case, an arrangement that minimizes the tilt angle on the camera side is desirable in order to avoid the trapezoidal distortion. Therefore, it is also possible to adopt a configuration where the tilt of the camera 11 is reduced by increasing the latitude of arrangement using the mirrors 23a and 23b individually as shown in FIG. 19.

The base material of the above-described screen 10 should have a level surface for image capturing by the camera 11, and possible embodiments of the screen 10 are as follows. A description is given below of embodiments of a drawn image data retention method, a drawn image data retention apparatus, and a projected image display unit, centering on embodiments of the screen 10.

First Embodiment

Figure 20:
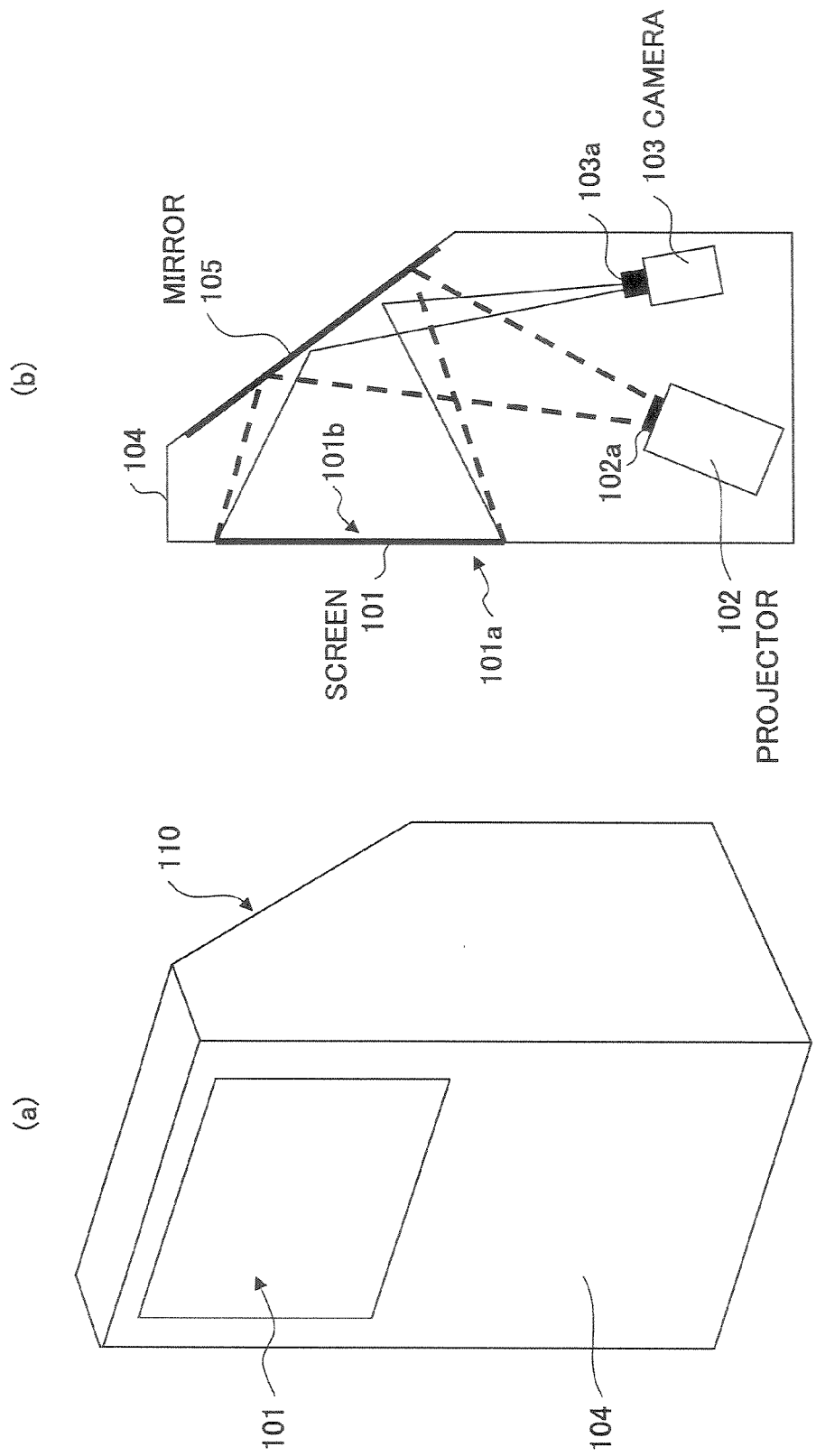
FIG. 20 is a diagram showing an example of a rear projection display unit.
Figure 21:
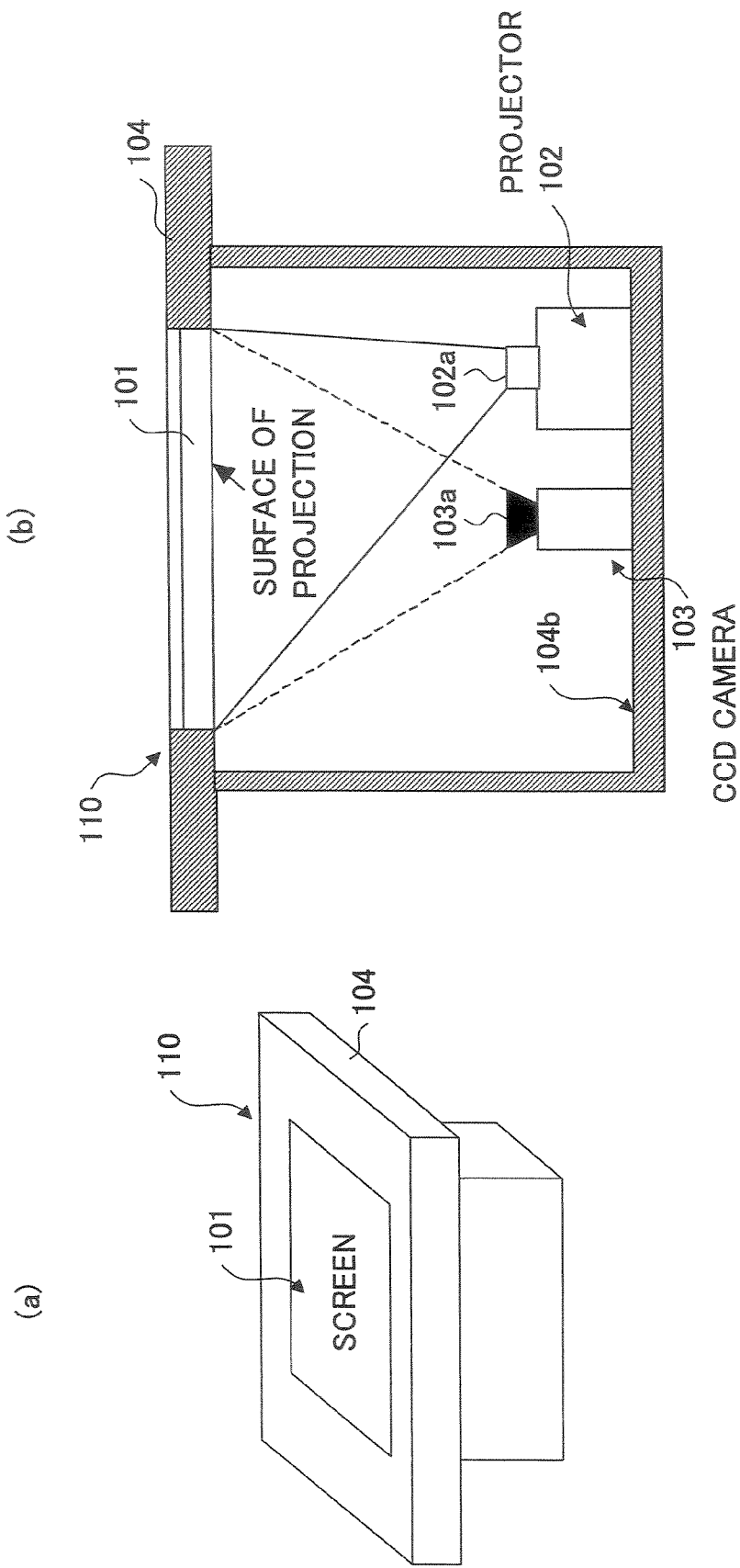
FIG. 21 is a diagram showing another example of the rear projection display unit.

FIGS. 20 and 21 are diagrams showing rear projection display units. FIG. 20(a) and FIG. 21(a) are external views, and FIG. 20(b) and FIG. 21(b) are side cross-sectional views.

A rear projection display unit 110 of this embodiment, an example of which is shown in FIG. 20, includes a screen 101 onto which an image is projected, a projector 102 that projects an image onto the screen 101, a digital camera 103 that captures the image of an object in the direction of the screen 101 from behind a rear surface of the screen 101 and obtains the captured image of the object, a mirror 105 placed at an angle to a display surface 101a of the screen 101 behind the rear surface 101b of the screen 101, an enclosure 104, and a computer (hereinafter referred to as "PC") not graphically illustrated.

The projector 102 and the digital camera 103 are connected to the PC.

Each of a lens surface 102a of the projector 102 through which an image is projected and a lens surface 103a of the digital camera 103 through which the image of an object is captured faces toward the mirror 105. Light projected from the projector 102 is reflected by the mirror 105 so that the optical path is directed to a direction perpendicular to the screen 101. A drawn image written onto the display surface 101a of the screen or light reflected from or transmitted through the contact surface of an object in contact with the display surface 101a of the screen is reflected by the mirror 105 and condensed by the lens 103a of the digital camera 103, and is captured by the built-in solid-state image sensing device (such as a CCD image sensing device) of the digital camera 103 so as to be converted into captured image data.

The PC has a display screen, and displays an image on the display surface based on image data generated using predetermined software (corresponding to image display means) or image data externally input from a camera or scanner. Meanwhile, the PC can send the image data representing the displayed image to the projector 102 and cause an image analogous to the image displayed on the display surface to be projected from the projector 102 onto the screen 101 based on the image data. A description is given below of the image display means.

Here, the enclosure 104 does not always have to be a vertical type, and may be a horizontal type with its side surfaces vertically positioned.

Further, the rear projection display unit 110 of this embodiment, which has the digital camera 103 that obtains drawn image data by capturing a drawn image written onto the display surface of the screen, may replace the digital camera 103 with, for example, a known digitizer capable of obtaining drawn image data electromagnetically or through infrared position detection from a drawn image written onto the screen 101.

The rear projection display unit 110 of another example shown in FIG. 21 is a table type, where the screen 101 is placed horizontally on the upper surface of a table and the projector 102 and the digital camera 103 are both placed in a bottom part 104b of the enclosure with their respective lens surfaces 102a and 103a facing toward the screen 101. Accordingly, the mirror 105 is not provided in the rear projection display unit 110 of FIG. 21.

Figure 22:
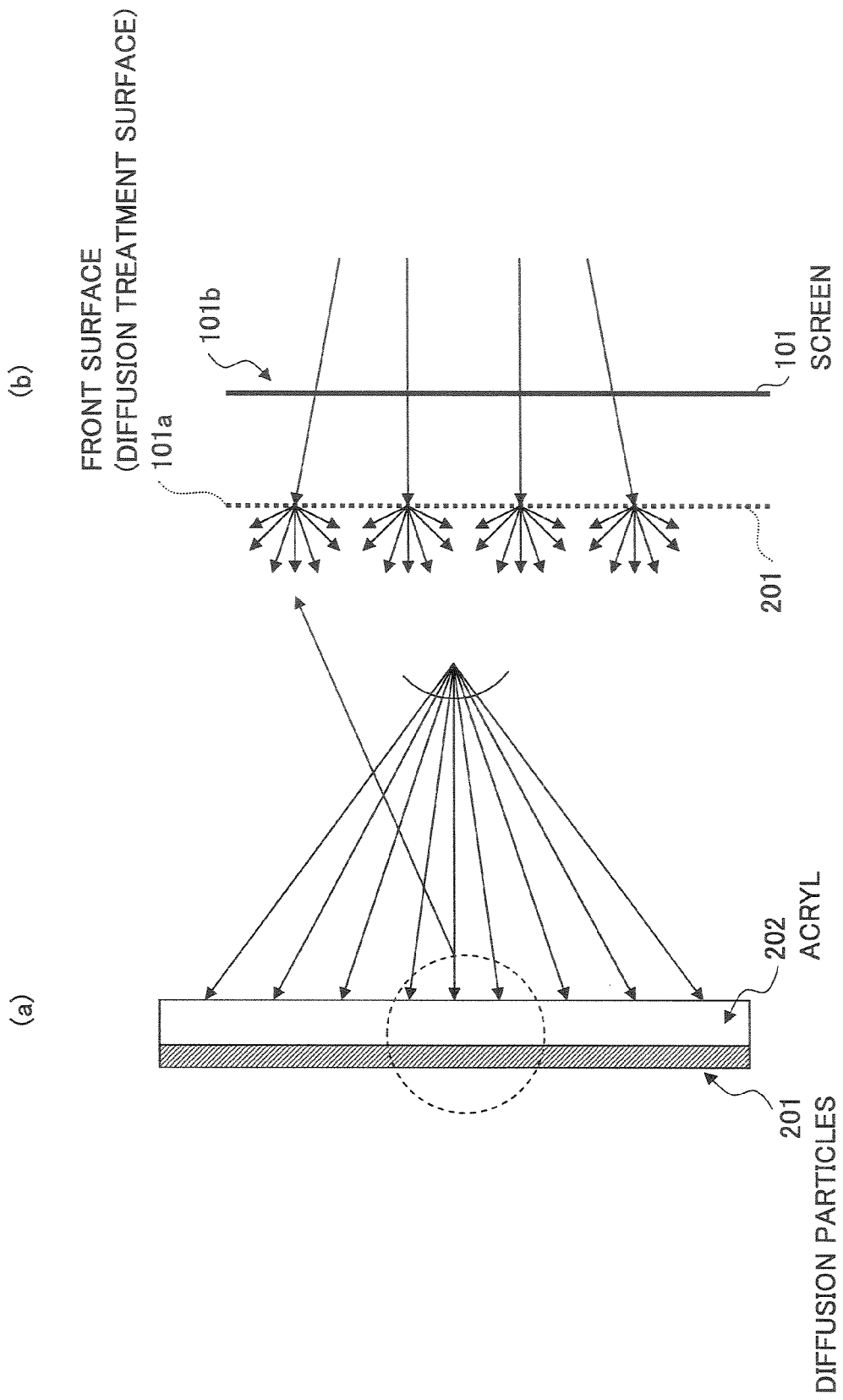
FIG. 22 is a schematic diagram showing a screen used in the rear projection display unit.
Figure 23:
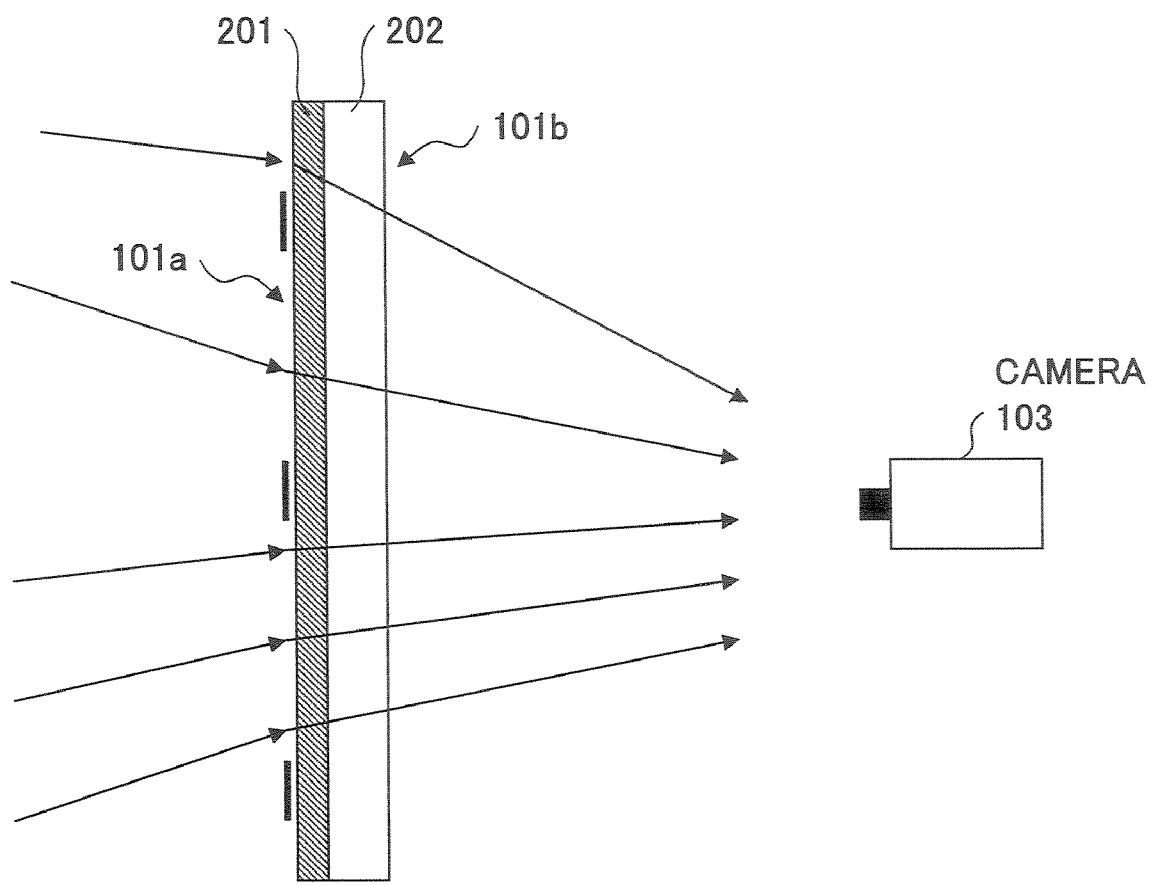
FIG. 23 is a schematic diagram showing the screen used in the rear projection display unit.

FIGS. 22 and 23 are schematic diagrams showing the screen used in the rear projection display unit of this embodiment.

As shown in FIGS. 22 and 23, the screen 101 of this embodiment includes a diffusion particle layer 201 formed of a transparent acrylic material and having diffusion treatment for diffusing light on the display surface 101a displaying an image and an acryl layer 202 without diffusion treatment. Diffusion treatment is performed by applying a transparent coating material containing fine particles that diffuse light on the surface of the acrylic material.

As shown in FIG. 22(a), when the light of the projector 102 is projected from the rear surface 101b side of the screen 101 of the embodiment with diffusion treatment, the light passing through the acryl layer 202 without diffusion treatment of the rear surface 101b reaches the diffusion particle layer 201 to be diffused by the diffusion particles of the diffusion particle layer 201 as shown in FIG. 22(b) that is an enlargement of the part of FIG. 22(a) encircled with a broken line. Accordingly, a viewer who views an image projected from the rear surface 101b side of the screen 101 from the display surface 101a side can view the projected image without depending on the viewing position.

As shown in FIG. 23, when the light entering the screen 101 from the display surface 101a side of the screen 101 travels toward the rear surface 101b side through the acryl layer 202 via the diffusion particle layer 201, the light that has entered from various angles scatters to be evenly distributed, so that a high contrast image can be obtained by performing image capturing on the rear surface 101b with the digital camera 103 on the rear surface 101b side.

Here, a transparent thin film is applied on the diffusion particle layer 201 of the display surface 101a. Further, this transparent thin film is coated with an antireflection film so as to increase the amount of light entering the camera. Preferably, the antireflection film has a reflectance of 1% or less at an incident angle of 0°. Further, a preferable film thickness including the thin film is less than or equal to 0.25 mm considering the transmittance of light projected from the projector and the contrast of written information.

Thus, a transparent thin film is applied on the diffusion particle layer 201. Accordingly, when characters or drawings are written on an image projected on the screen 101 with a marker, it is possible to erase the written characters or drawings with ease. Further, the coating of an antireflection film suppresses reflection of light on the screen surface so as to prevent a surrounding background from being captured to improve the visibility of the projected image.

The rear projection display unit of this embodiment uses the screen 101 of such a configuration. Accordingly, an image can be captured of not only a drawn image (characters or drawings) written onto the display surface of the screen 101 but also an object placed on the display surface side of the screen 101 using illuminating external light. That is, the image can be captured as a shadow if transmittivity is poor and as a colored pattern in the case of a marker with some transmittivity. Further, the image of original material superposed on the display surface of the screen 101 can be captured by performing monochromatic projection from the projector 102 and using its light as illuminating light because external light cannot be used.

In this embodiment, the diffusion particle layer 201 is formed by applying diffusion particles on the surface of acryl, thereby diffusing passing light. Such a method based on application of diffusion particles is advantageous in terms of productivity and cost. However, there is no limitation to this method, and the diffusion effect can also be obtained by directly processing acryl by cutting or grinding.

Further, the transparent base material of the screen 101 is preferably acryl in terms of processability and cost, but is not necessarily limited thereto. It may be any material that has a refractive index approximate to air and is transparent.

Figure 24:
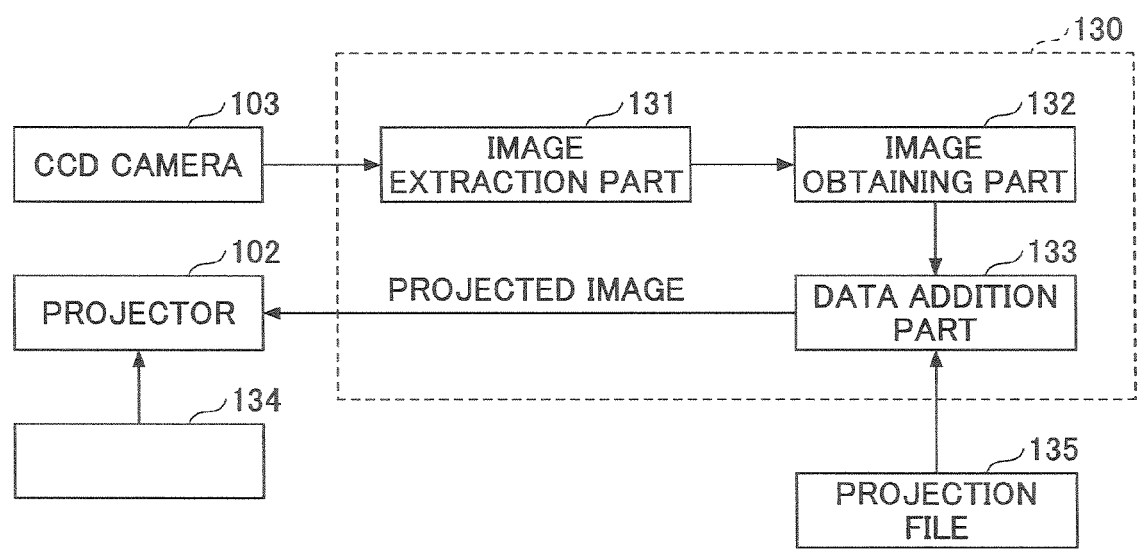
FIG. 24 is a diagram showing image display means of the rear projection display unit as an example.
Figure 25:
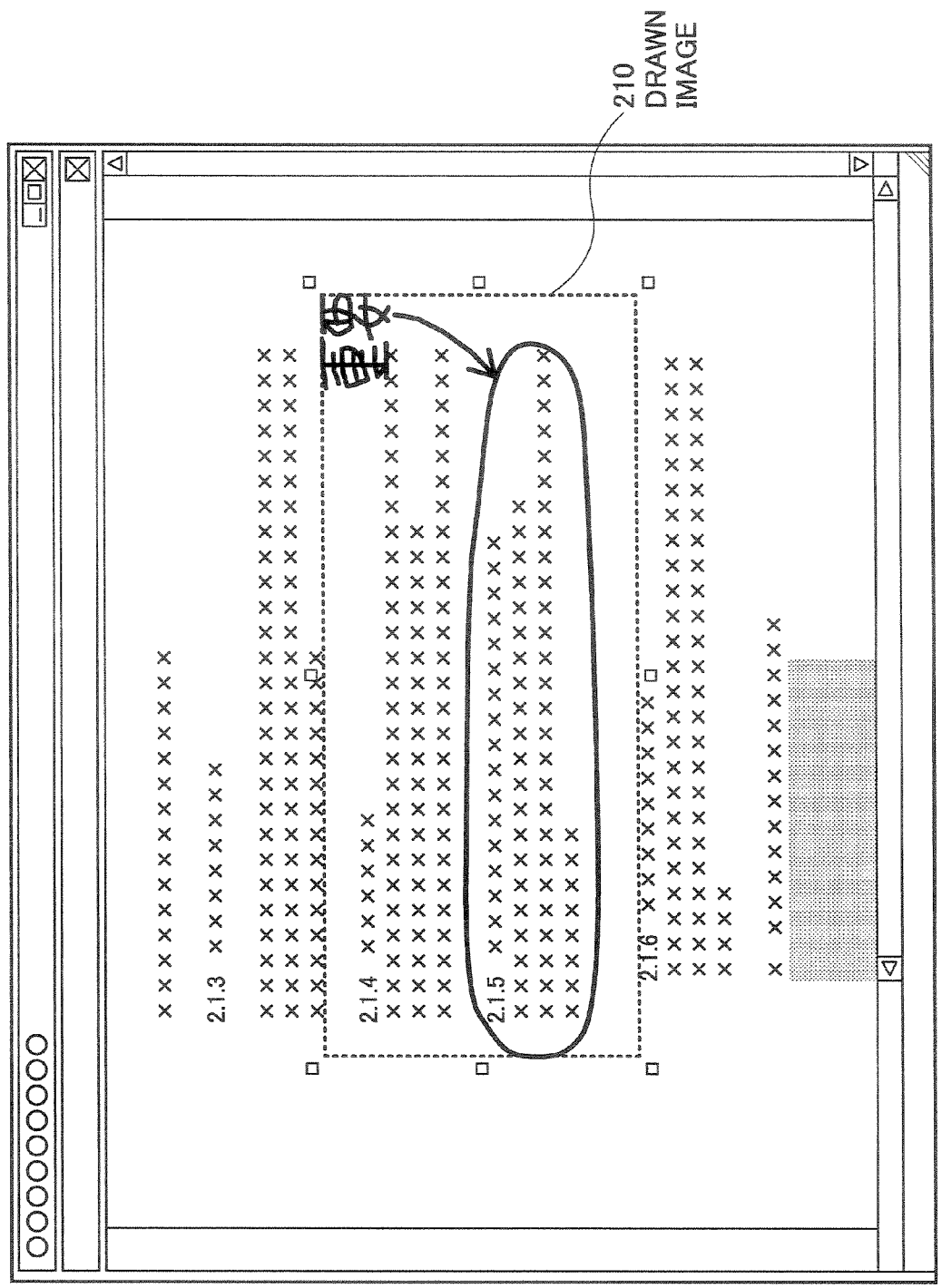
FIG. 25 shows a composite image projected onto the screen from the projector.

FIGS. 24 and 25 are diagrams showing the image display means of the rear projection display unit of this embodiment.

Image display means 130, an example of which is shown in FIG. 24, includes an image extraction part 131 that extracts, of drawn image data obtained by the digital camera 103, those of a drawn image written onto the screen 101, an image obtaining part 132 that determines the size and position in which the extracted drawn image data are pasted, a data addition part 133 that creates composite data by pasting the drawn image data having its pasting position, etc., determined by the image obtaining part 132 to image data based on a generated or externally input projection file, and switch means 134 that switches an image projected onto the screen 101 by the projector 102 to illuminating light depending on whether it is the case of capturing the image of a drawn image written onto the display surface of the screen 101 with the digital camera 103, the case of capturing the image of the shadow on an object appearing on the screen 101 with the digital camera 103, or the case of capturing the image of original material superposed on the display surface with the digital camera 103.

In the case of capturing the image of original material superposed on the screen 101 with the digital camera 103, the switch means 134 stops projecting an image and emits illuminating light from the projector 102 since external light does not reach the surface of the original material.

The image display means 130 is a program that is installed in the PC connected to the projector 102 and the digital camera 103 and has the function of creating composite data by, for example, pasting drawn image data captured by the digital camera 103 to the projection file 135 generated using an application program of the PC. Based on the created composite data, a composite image where a drawn image 210 represented by the drawn image data is pasted to the image that has been projected is projected from the projector 102 onto the screen 101 as shown in FIG. 25.

Figure 26:
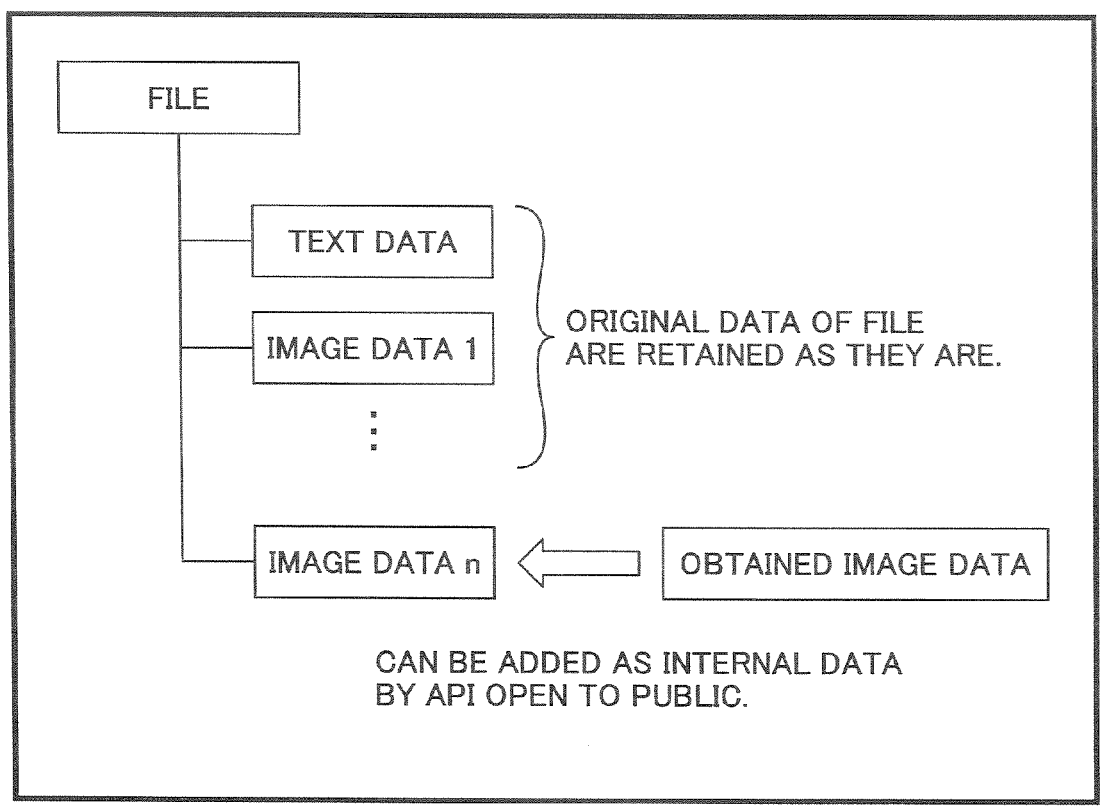
FIG. 26 shows being retained as the internal data of a projection file.

An API (Application Programming Interface) is open to the public for the program used to create the projection file shown in FIG. 26. Accordingly, the drawn image data captured by the digital camera 103 can be pasted to the image data projected onto the screen 101 based on the projection file using the program for which API is open to the public, and can be stored as the internal data of the projection file of the projected image.

Thereby, it is possible to paste drawn image data into the projection file that has been projected onto the screen 101 and to check it on the screen 101. In addition, it is possible to store the projection file to which the drawn image data are bound. Therefore, later re-editing and cutting the pasted drawn image data are possible.

What the digital camera 103 captures does not always have to be a handwritten drawn image, and may be printed original material. The contents of paper material may be captured as drawn image data and used with electronic material.

Figure 27:
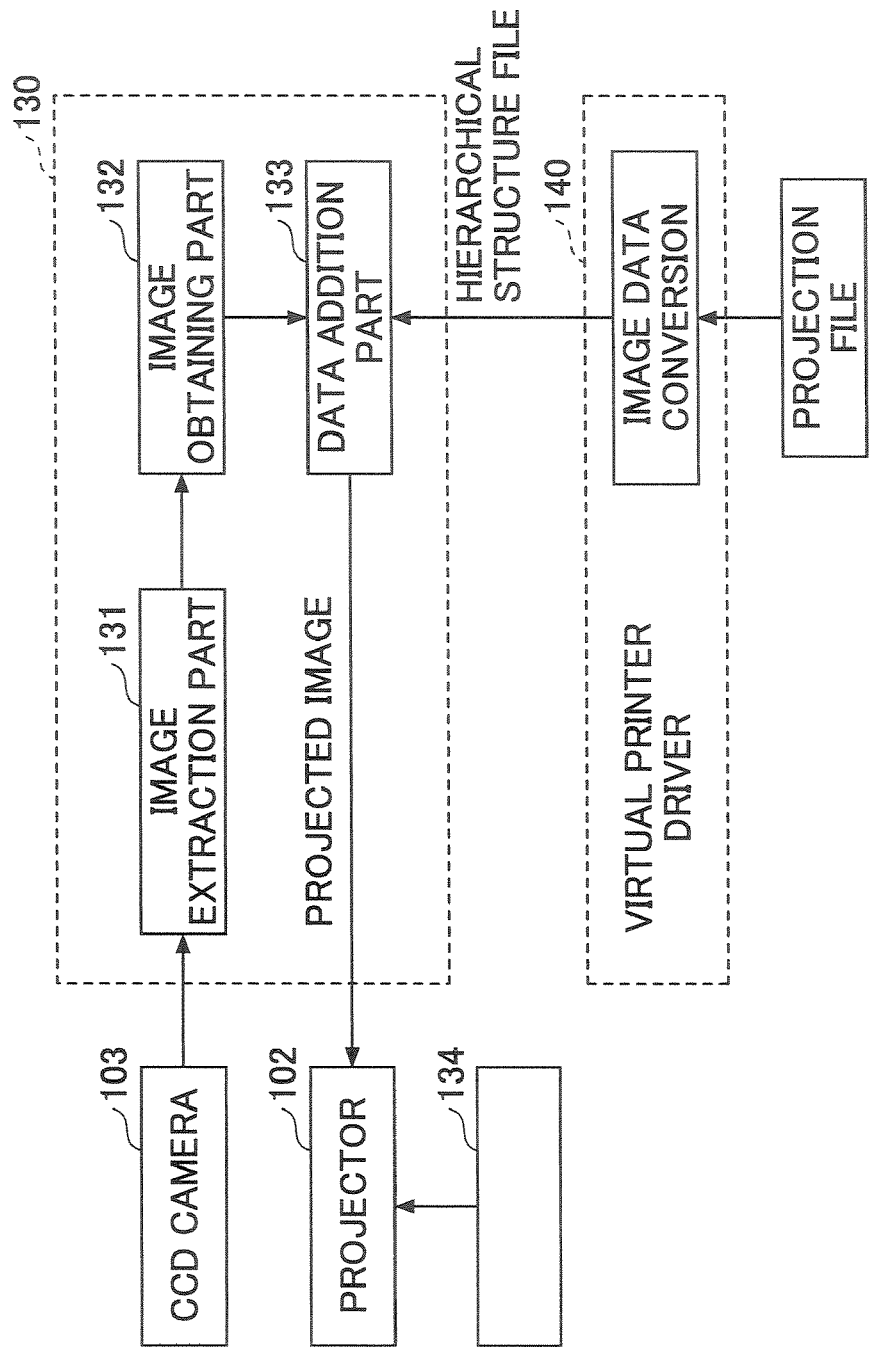
FIG. 27 is a diagram showing the image display means of the rear projection display unit as another example.

The image display means 130, another example of which is shown in FIG. 27, includes the image extraction part 131 that extracts, of drawn image data obtained by the digital camera 103, those of a drawn image written onto the screen 101, the image obtaining part 132 that determines the size and position in which the extracted drawn image data are pasted, the data addition part 133 that creates composite data by pasting the drawn image data having its pasting position, etc., determined by the image obtaining part 132 to a projection file converted into bitmap data, and the switch means 134 that switches an image projected onto the screen 101 by the projector 102 to illuminating light depending on whether it is the case of capturing the image of a drawn image written onto the display surface of the screen 101 with the digital camera 103, the case of capturing the image of the shadow on an object appearing on the screen 101 with the digital camera 103, or the case of capturing the image of original material superposed on the display surface with the digital camera 103.

In the case of capturing the image of original material superposed on the screen 101 with the digital camera 103, the switch means 134 stops projecting an image and emits illuminating light from the projector 102 since external light does not reach the surface of the original material.

In this example, the image (document) of a projection file created with a program for which no API is open to the public is projected. Accordingly, the bitmap data converted into a file having a hierarchical structure by a virtual printer driver 140 are input to the data addition part 133. It is the same as the image display means 130 shown in FIG. 24 except that the bitmap data converted by the virtual printer driver 140 are input.

Here, a printer driver is generally a program for printing the printing information of an application on paper, while the virtual printer driver 140 is a program for outputting printing information to other than actual printers as an image. Accordingly, in the case of an application with a printing function, the information of a file is output as image information by setting this virtual printer driver 140 as the driver of an output destination.

Figure 28:
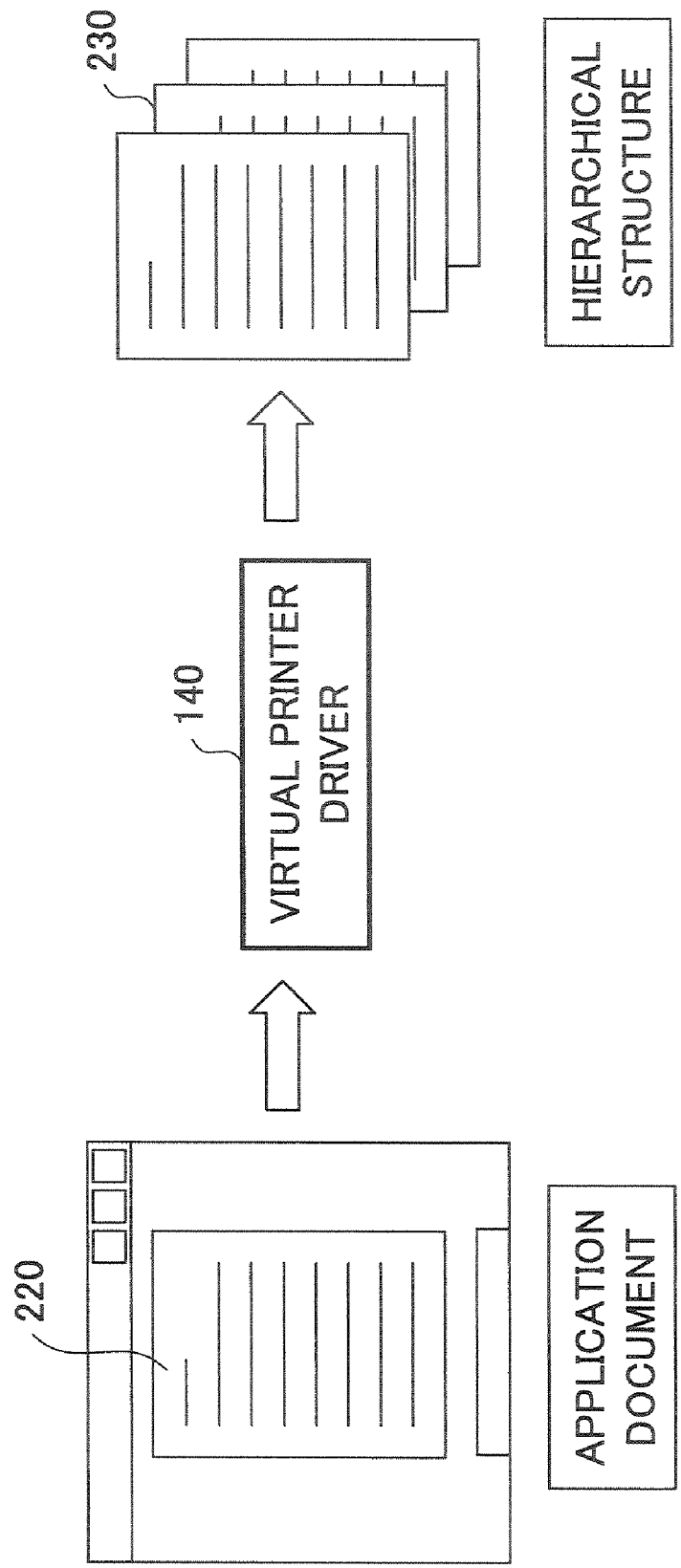
FIG. 28 is a diagram showing creation of an image file having a hierarchical structure by performing conversion with a virtual printer driver.

As shown in FIG. 28, by converting a document image 220 of a projection file created with a program for which no API is open to the public with the virtual printer driver 140, an image file 230 having a hierarchical structure can be created.

The document image 220 created with the program having no API open to the public is loaded into a hierarchically structured image file through the virtual printer driver 140 by the printing function. Since any image data can be added to this image file, it is possible to add information without being restricted by the application.

Figure 29:
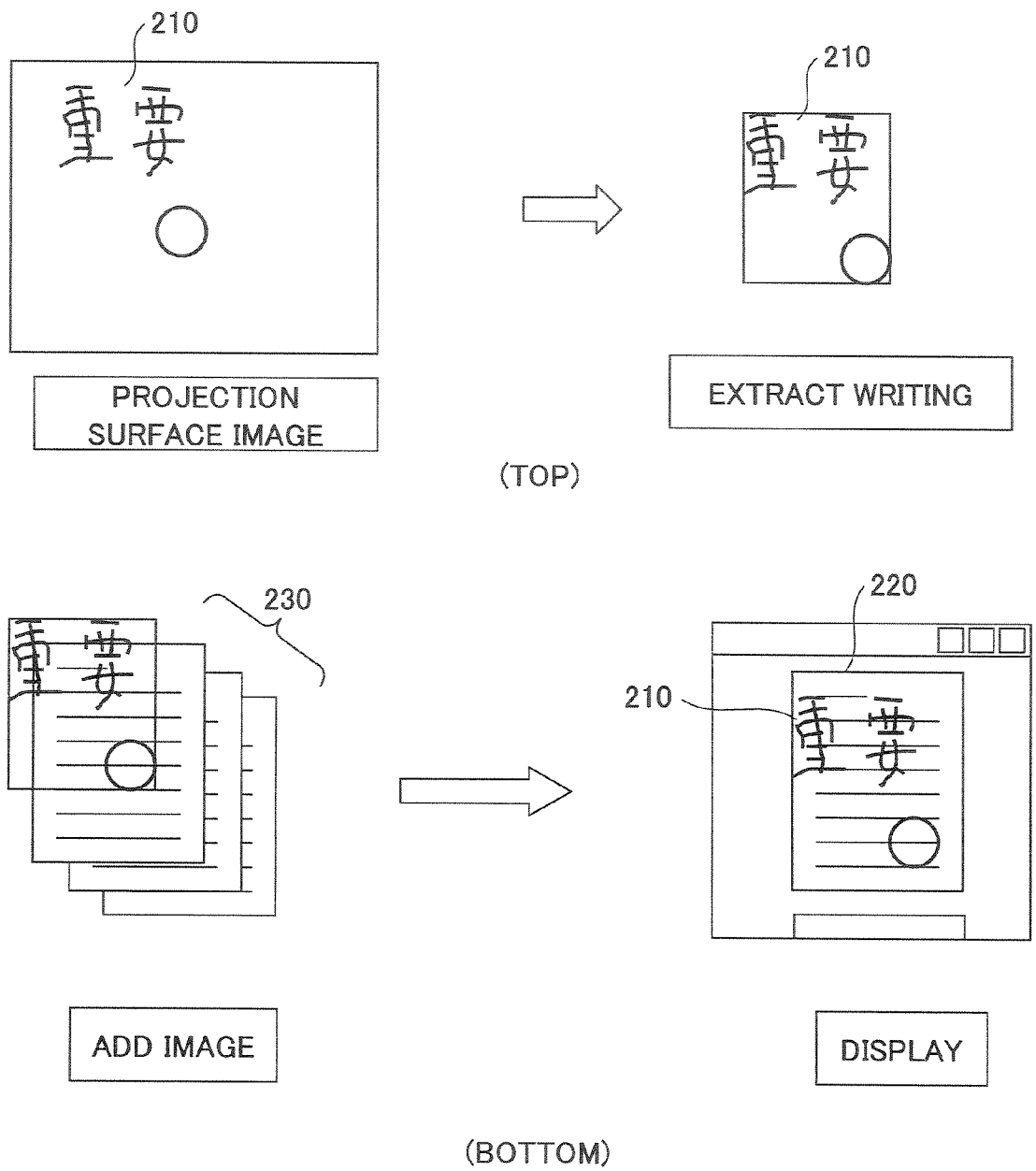
FIG. 29 is a diagram showing extracting the data of a written drawn image itself from drawn image data (top) and displaying them on a screen as a superposition of a document image and a drawn image (bottom).

Accordingly, in the case of a projection file created with a program for which no API is open to the public, when writing is performed over a file projected onto the screen 101 from the projector 102, it is possible to capture the image of the written drawn image with the digital camera 103 and extract the data of the written drawn image from obtained drawn image data (top), and to add the extracted drawn image data to the hierarchically structured image file 230 loaded through the virtual printer driver 140 and display them as a superposition of the document image 220 and the drawn image 210 on the screen of the PC (bottom) as shown in FIG. 29.

Figure 30:
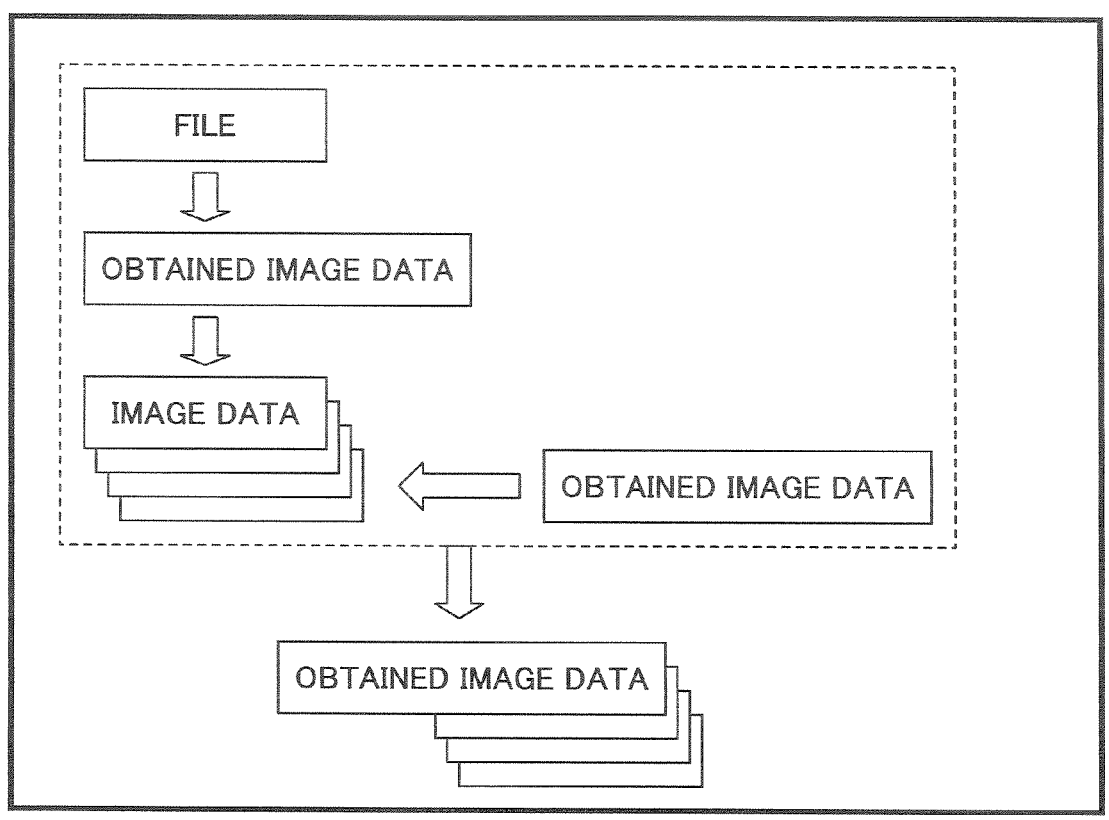
FIG. 30 is a diagram showing superposing drawn image data on a page of image files obtained as a result of conversion to which page the drawn image data are to be pasted and retaining them in a bound state.

No API is open to the public for a program used to create a projection file shown in FIG. 30. Accordingly, the drawn image data captured by the digital camera 103 cannot be pasted as the internal data of the projection file projected onto the screen 101. On the other hand, if the data are combined to display a composite image on the screen 101, the data of the combined part disappear. Therefore, in this example, the projection file is converted into page-by-page image files by the virtual printer driver 140, and the drawn image data are superposed on a page of the image files to which the drawn image data are to be pasted. Thereby, it is possible to link the drawn image data with the image files and retain them in a bound state without losing the original projection file.

Thus, by creating a hierarchically structured file through the virtual printer driver 140, an application having a printing function can manage an application document and added information such as a written drawn image in a later editable manner.

Second Embodiment

Compared with the first embodiment, the second embodiment is different in the structure of the screen 101, where a transparent flat plate member is stuck with an adhesive agent to the back side of the display surface with diffusion treatment of the screen 101 used for the rear projection display unit 110, but the other points are common. Accordingly, a description is given of the structure of the screen 101, which structure is different.

First, as a comparative example, a description is given of a conventionally used structure of the screen 101 where a Fresnel lens is provided on the rear surface side.

Figure 31:
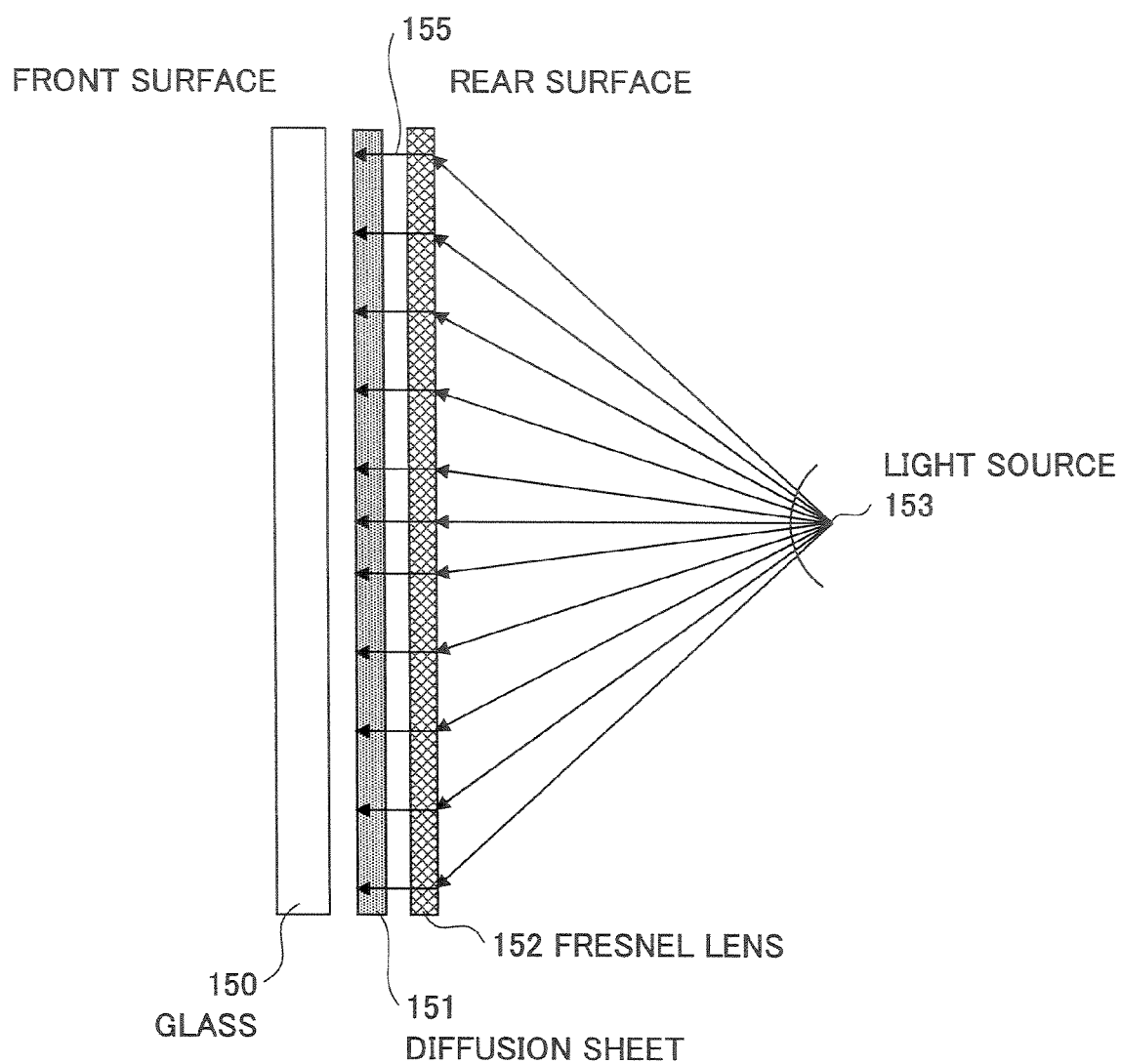
FIG. 31 is a schematic diagram showing the structure of the screen of a comparative example in which a Fresnel lens is provided on the rear surface side.

FIG. 31 is a schematic diagram showing the structure of the screen of the comparative example where a Fresnel lens is provided on the rear surface side.

The screen 101 shown in FIG. 31 has a Fresnel lens 152, a diffusion sheet 151, and a reinforcement glass 150 in a layered structure from the rear surface side to the display surface side. In order to eliminate unevenness in the amount of light projected onto the rear surface side from a light source 153, the light that has entered at different angles is converted into a parallel optical path 155 by the Fresnel lens 152 so as to be projected onto the diffusion sheet 151, so that a projected image can be visually recognized from the display surface side.

Thus, the screen 101 of this structure emphasizes the visibility of a projected image to a viewer on the display surface side. Accordingly, in the case of capturing the image of the screen surface from the rear surface side of the screen 101 of this structure, an object on the display surface side of the screen 101 is blurred by the effect of the Fresnel lens. Further, in the case of performing image capturing with the digital camera 103 with projection from the light source 153, the reflected light of the projected light on the surface of the Fresnel lens 152 interferes so that noise enters a captured image if monochrome display is performed to use the projected light as auxiliary light for the image capturing with the digital camera 103, for example.

Figure 32:
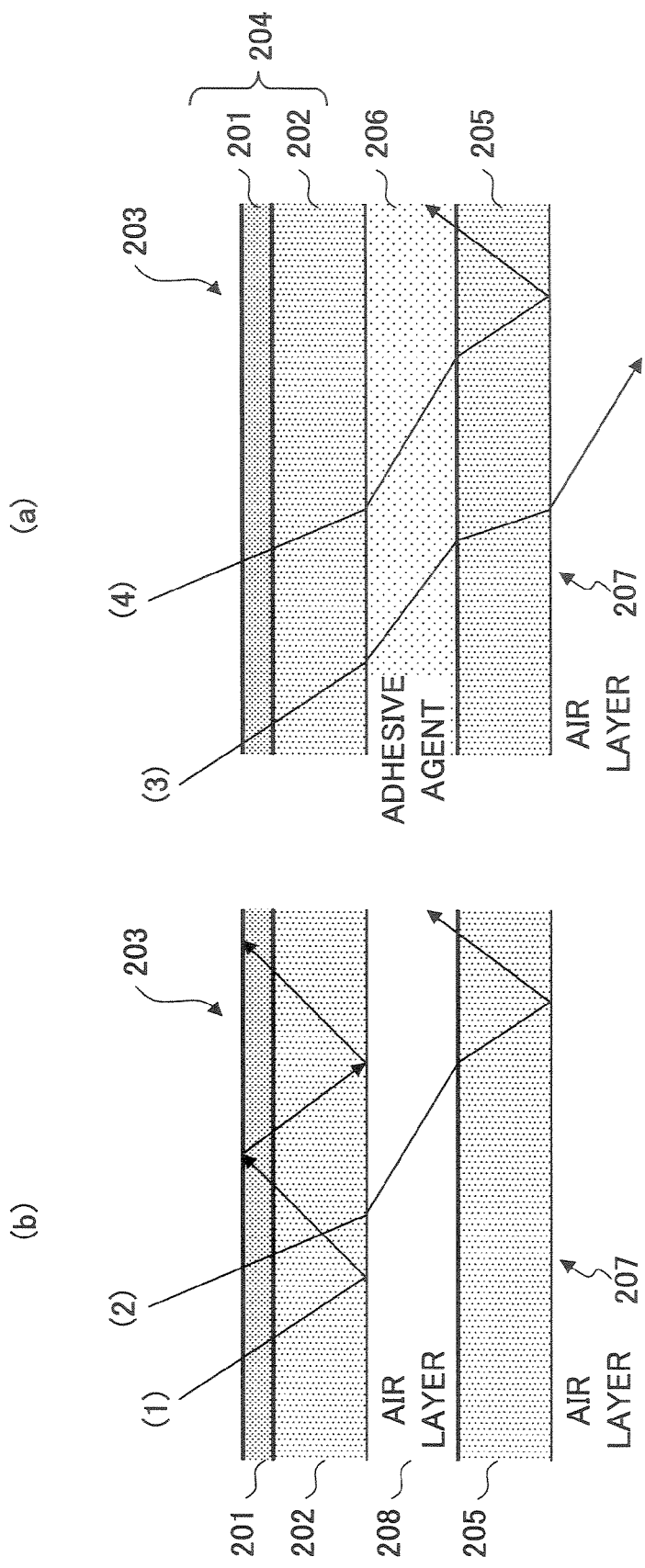
FIG. 32 is a diagram illustrating a structure of the screen.

FIG. 32 is a diagram illustrating screen structures. FIG. 32(*a*) shows a structure with sticking with an adhesive agent, and FIG. 32(*b*) shows a structure without sticking with an adhesive agent.

The appearance of a rear image projection unit is the same as illustrated using FIGS. 20 and 21 in the first embodiment. In particular, in the case of the table-type one shown in FIG. 21, a user may put a hand or object on the screen surface at the time of having a meeting around it. Accordingly, the screen surface needs enough strength to sustain it and it is often the case that that large screens naturally need strength to be used in presentations or conferences.

Accordingly, it is necessary to provide a reinforcement plate on the side opposite to the display surface side. With the reinforcement plate simply attached, there is an air layer between the acryl member forming the display surface and the reinforcement acryl member.

In FIG. 32, the screen includes a display-surface-side transparent member 204 that has the diffusion particle layer 201 with diffusion treatment and the acryl layer 202 and on which a projected image is displayed, and a rear-surface-side transparent flat-plate member 205 to which the projected image is projected.

The display-surface-side transparent member 204 has the diffusion particle layer 202 formed by applying diffusion particles on the surface of a flat plate acrylic material.

Further, transparent thin films 203 and 207 are applied on the display-surface-side transparent member 204 and the rear-surface-side flat plate member 205, respectively, and the thin films 203 and 207 are coated with respective antireflection films.

The antireflection films are determined so as to have a reflectance of 1% or less at an incident angle of 0°.

According to the screen of the structure where the display-surface-side transparent member 204 and the rear-surface-side flat plate member 205 are stuck together with an adhesive agent 206, materials are selected so that each of the display-surface-side transparent member 204 and the rear-surface-side flat plate member 205 is formed of an acrylic material having a refractive index of, for example, 1.4 and the adhesive agent 206 has a refractive index more than or equal to the refractive index of the acrylic material.

For example, an ultraviolet curing adhesive agent may be used as the adhesive agent. However, the adhesive agent is not necessarily limited to this, and may be any adhesive agent having a refractive index approximate to that of the flat plate member 205 and having the quality of becoming transparent in color after curing.

In general, total internal reflection occurs when light enters a substance of a lower refractive index from a substance of a higher refractive index. Because of this quality, if there are two contact planes of the acryl member and air between the front surface and the rear surface of the screen as shown in FIG. 32(*a*), total internal reflection may occur at two planes (1) and (2). This reduces the rate at which external light that has entered from the front surface of the screen reaches the rear surface by half.

However, by bonding the display-surface-side transparent member 204 and the rear-surface-side flat plate member 205 with a substance having a refractive index higher than and approximate to that of the acryl member, the total internal reflection at the first plane boundary is eliminated (3) and (4).

As a result, compared with the case where there is an air layer, the light entering the rear surface increases so as to increase the amount of light on the rear surface of the screen, so that when an image is captured with a camera from the rear surface side, the contrast of the captured image increases.

Thereby, it is possible to obtain drawn image data with higher lightness and higher resolution in the case of capturing the image of an object on the display surface side from the rear surface side of the screen with a camera.

Further, the rear-surface-side transparent member 205 is coated with the antireflection film 207. This suppresses reflection of light projected from a projector, so that it is possible to suppress noise due to a projected image in the case of, for example, capturing the image of written characters with a camera.

FIG. 33 is a diagram showing light transmission characteristics in the case of providing antireflection films in order to prevent external light from entering the screen of this embodiment. FIG. 33(*a*) shows one with high peak gain, FIG. 33(*b*) shows one with slightly high peak gain, and FIG. 33(*c*) shows one with flat gain.

In FIG. 33, the horizontal axis represents an angle at which a viewer views the screen surface, and the vertical axis represents gain.

Thus, by performing various types of tinting of different angles, it is possible to configure screens according to purposes that allow a good quality image captured from the rear surface to be obtained without reducing the quality of an image projected from a projector.

Since the screen of this embodiment has a reinforcement plate on the rear surface side, it is possible to increase the size of the screen. Accordingly, while it is used as a screen for a rear-projection-type display in conferences or presentations so as to display the electronic material of a PC on the screen, it is possible to write directly over what is displayed on the screen using a water based marker as if it were a whiteboard if there is any change or addition to what is displayed on the screen.

The screen of this embodiment has a transparent thin film applied on the display surface. Accordingly, it is possible to perform writing on the screen with ease using a marker as if it were a whiteboard, and it is also possible to erase it later with ease. Further, it is possible to capture the image of a drawn image, which has been superposed and written over a projected image while viewing the projected image, from the rear surface with a camera; to extract the written information and paste it to the projected image; and to project a composite image by the pasting onto the screen and view it. It is also possible to bind the written drawn image information to the data of the original projection file and store them and to edit them later.

A drawn image data retention method according to the present invention, wherein drawn image data obtained from a drawn image superposed and written over an image projected onto a screen is retained, being bound to image data representing the image, may be characterized by projecting the image based on the image data input to image display means onto the screen from behind the rear surface of the screen on the side opposite to its display surface using a projector; obtain the drawn image data by capturing the image of the drawn image, written onto the display surface of the screen onto which the image is projected, from behind the rear surface of the screen using a camera; and pasting the obtained drawn image data to the image data input to the image display means, projecting a composite image based on the composite data by the pasting onto the screen from behind the rear surface using the projector, and binding the obtained drawn data to the image data and retaining them.

Thus, drawn image data are obtained by capturing the image of a drawn image written onto a screen onto which an image is projected with a camera, and composite data into which the obtained drawn image data are merged with image data representing the image are retained. Accordingly, it is easy to manage the drawn image data.

Further, a drawn image data retention apparatus according to the present invention, wherein drawn image data obtained from a drawn image superposed and written over an image projected onto a screen is retained, being bound to image data representing the image, may be characterized by a projector projecting the image based on the predetermined image data onto the screen from behind the rear surface of the screen on the side opposite to its display surface; a camera obtaining the drawn image data by capturing the image of an object on the display surface side of the screen, onto which the image is projected, from behind the rear surface of the screen; and image display means for sending generated image data to the projector, and if the drawn image data captured by the camera are input thereto from the camera, sending composite data where all or part of the input drawn image data is pasted to the image data to the projector, wherein the image display means may bound and retain the drawn image data and the image data.

Thus, image display means for pasting all or part of drawn image data obtained by performing image capturing with a camera to image data projected from a projector is provided. Accordingly, a composite image based on the composite data by the pasting can be viewed and retained.

A projected image display unit according to the present invention including a screen; a projector projecting a projection image based on image data input from image display means onto a screen from behind the rear surface of the screen on the side opposite to its display surface; and a camera obtaining captured image data by capturing the image of an object in the direction of the screen from behind the rear surface, wherein the projector projects onto the screen a projection image based on composite data where the obtained captured image data are pasted to the image data, may be characterized in that the screen is formed of a transparent member having a transparent thin film applied on the display surface subjected to light diffusion treatment, and the camera obtains the captured image data by capturing the image of a drawn image erasably written onto the thin film of the screen or the image of the contact surface of an object in contact with the screen.

Thus, the screen is subjected to diffusion treatment and has a transparent thin film applied thereon. Accordingly, writing with a marker and erasure are easy.

According to the above-described drawn image data retention method and drawn image data retention apparatus, image data projected onto a screen and drawn image data related to a figure or written characters or drawings on the display surface of the screen can be bound together and retained in an editable state.

Further, according to the above-described projected image display unit, it is possible to improve the visibility of a projected image on the display surface of a screen, and it is also possible to ensure a necessary amount of light for capturing the image of an object on the display surface side of the screen from the rear surface of the screen and obtain high-resolution data by capturing the image.

The present application is a national stage application of PCT/JP2006/312970, filed Jun. 29, 2006, and which claims priority based on Japanese Patent Application No. 2005- 192511, filed on Jun. 30, 2005, the entire contents of both of which are hereby incorporated by reference.

The invention claimed is:

1. A projected image display unit, comprising:
a display surface configured to display an image;
projection means for projecting the image onto the display surface; and
image capturing means for performing image capturing on the display surface, the image capturing means being placed on a same side of the display surface as the projection means,
wherein the image capturing means is placed at a position so that a point that is plane-symmetric to the projection means, with the display surface as the axis of symmetry, is out of a range of an angle of view of the image capturing means.

2. A projected image display unit, comprising:
a display surface configured to display an image;
projection means for projecting the image onto the display surface; and
image capturing means for performing image capturing on the display surface, the image capturing means being placed on a same side of the display surface as the projection means,
wherein the projection means is placed at a position so that a point that is plane-symmetric to the image capturing means, with the display surface as the axis of symmetry, is out of a range of an angle of view of the projection means.

3. The projected image display unit as claimed in claim 1, further comprising:
changing means for changing an optical path of the projection means and an optical path of the image capturing means.

4. The projected image display unit as claimed in claim 3, wherein the changing means changes the optical path of the projection means and the optical path of the image capturing means with a reflection plane reflecting light.

5. The projected image display unit as claimed in claim 3, wherein the changing means changes the optical path of the projection means and the optical path of the image capturing means so that the optical paths pass through the display surface.

6. The projected image display unit as claimed claim 3, wherein the image capturing means is placed so that the optical path of the projection means and the optical path of the image capturing means are prevented from overlapping each other on a reflection plane of the changing means.

7. The projected image display unit as claimed claim 3, wherein the projection means is placed so that the optical path of the projection means and the optical path of the image capturing means are prevented from overlapping each other on a reflection plane of the changing means.

8. The projected image display unit as claimed in claim 1, further comprising:
changing means for projection for changing the optical path of the projection means so that the optical path of the projection means passes through the display surface; and
changing means for image capturing for changing the optical path of the image capturing means so that the optical path of the image capturing means passes through the display surface.

9. The projected image display unit as claimed in claim 1, wherein the projection means displays an image captured by the image capturing means in which a distortion is corrected.

10. The projected image display unit as claimed in claim 1, wherein the image capturing means is capable of shifting or tilting a lens of the image capturing means.

11. The projected image display unit as claimed claim 1, wherein the projection means is capable of shifting or tilting a lens of the projection means.

12. The projected image display unit as claimed in claim 1, wherein the image capturing means captures an image of a writing formed on the display surface or an image in contact with the display surface.

13. The projected image display unit as claimed in claim 1, wherein a projection area of the projection means on the display surface is substantially equal to an image capturing area of the image capturing means.

14. The projected image display unit as claimed in claim 2, further comprising:
    changing means for changing an optical path of the projection means and an optical path of the image capturing means.

15. The projected image display unit as claimed in claim 14, wherein the changing means changes the optical path of the projection means and the optical path of the image capturing means with a reflection plane reflecting light.

16. The projected image display unit as claimed in claim 14, wherein the changing means changes the optical path of the projection means and the optical path of the image capturing means so that the optical paths pass through the display surface.

17. The projected image display unit as claimed in claim 14, wherein the image capturing means is placed so that the optical path of the projection means and the optical path of the image capturing means are prevented from overlapping each other on a reflection plane of the changing means.

18. The projected image display unit as claimed in claim 14, wherein the projection means is placed so that the optical path of the projection means and the optical path of the image capturing means are prevented from overlapping each other on a reflection plane of the changing means.

19. The projected image display unit as claimed in claim 2, further comprising:
    changing means for projection for changing the optical path of the projection means so that the optical path of the projection means passes through the display surface; and
    changing means for image capturing for changing the optical path of the image capturing means so that the optical path of the image capturing means passes through the display surface.

20. The projected image display unit as claimed in claim 2, wherein the projection means displays an image captured by the image capturing means in which a distortion is corrected.

21. The projected image display unit as claimed in claim 2, wherein the image capturing means is capable of shifting or tilting a lens of the image capturing means.

22. The projected image display unit as claimed in claim 2, wherein the projection means is capable of shifting or tilting a lens of the projection means.

23. The projected image display unit as claimed in claim 2, wherein the image capturing means captures an image of a writing formed on the display surface or an image in contact with the display surface.

24. The projected image display unit as claimed in claim 2, wherein a projection area of the projection means on the display surface is substantially equal to an image capturing area of the image capturing means.

25. A projected image display unit, comprising:
    a display surface configured to display an image;
    a projector configured to project the image onto the display surface; and
    a camera configured to perform image capturing on the display surface, the camera being placed on a same side of the display surface as the projector,
    wherein the camera is placed at a position so that a point that is plane-symmetric to the projector, with the display surface as the axis of symmetry, is out of a range of an angle of view of the camera.

26. A projected image display unit, comprising:
    a display surface configured to display an image;
    a projector configured to project the image onto the display surface; and
    a camera configured to perform image capturing on the display surface, the camera being placed on a same side of the display surface as the projector,
    wherein the projector is placed at a position so that a point that is plane-symmetric to the camera, with the display surface as the axis of symmetry, is out of a range of an angle of view of the projector.

* * * * *